US008665274B2

(12) United States Patent
Breeds et al.

(10) Patent No.: US 8,665,274 B2
(45) Date of Patent: Mar. 4, 2014

(54) METHOD AND SYSTEM FOR GENERATING AND DISPLAYING AN INTERACTIVE DYNAMIC VIEW OF BI-DIRECTIONAL IMPACT ANALYSIS RESULTS FOR MULTIPLY CONNECTED OBJECTS

(75) Inventors: Robert J. Breeds, Swindon (GB); Philip R. Taunton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 12/243,909

(22) Filed: Oct. 1, 2008

(65) Prior Publication Data

US 2010/0079462 A1    Apr. 1, 2010

(51) Int. Cl.
*G06T 11/20* (2006.01)

(52) U.S. Cl.
USPC ........................................................ 345/440

(58) Field of Classification Search
CPC ..................................................... G06T 11/206
USPC ........................................................ 345/440
See application file for complete search history.

(56) References Cited

U.S. PATENT DOCUMENTS

| | | |
|---|---|---|
| 5,136,690 A | 8/1992 | Becker et al. |
| 5,515,487 A | 5/1996 | Beaudet et al. |
| 5,535,145 A | 7/1996 | Hathaway |
| 5,555,201 A | 9/1996 | Dangelo et al. |
| 5,596,703 A | 1/1997 | Eick et al. |
| 5,623,590 A | 4/1997 | Becker et al. |
| 5,699,255 A | 12/1997 | Ellis et al. |
| 5,835,085 A | 11/1998 | Eick et al. |
| 5,926,177 A | 7/1999 | Hatanaka et al. |
| 6,144,379 A | 11/2000 | Bertram et al. |
| 6,301,579 B1 | 10/2001 | Becker |
| 6,529,948 B1 | 3/2003 | Bowman-Amuah |
| 6,972,762 B2 | 12/2005 | Ben-Tovim et al. |
| 7,023,440 B1 | 4/2006 | Havekost et al. |
| 7,292,246 B2 | 11/2007 | Goldschmidt |
| 7,446,769 B2 | 11/2008 | Molander et al. |
| 7,605,814 B1 | 10/2009 | Critz |
| 7,609,257 B2 | 10/2009 | Wright et al. |

(Continued)

FOREIGN PATENT DOCUMENTS

WO         01 27878         4/2001

OTHER PUBLICATIONS

Athanasios Douitsis and Dimitrios Kalogeras; Interactive Network Management Visualization with SVG and AJAX; 2006; LISA '06 Proceedings of the 20th conference on Large Installation System Administration; Publisher USENIX Association Berkeley; pp. 233-245.*

(Continued)

*Primary Examiner* — Jeffery A Brier
(74) *Attorney, Agent, or Firm* — Kenneth L. Sherman, Esq.; Michael A. Zarrabian, Esq.; Sherman & Zarrabian LLP

(57) ABSTRACT

A method and system for generating a graph view on a user interface in a computing environment, is provided. One implementation involves, at a server, generating graph coordinate data for a dependency graph view of bi-directional impact analysis results for multiply connected objects in a data source; transmitting the graph coordinate data to a client as lightweight object data; and at the client, based on the lightweight object data rendering an interactive dynamic dependency graph view on a user interface.

20 Claims, 25 Drawing Sheets

(56) References Cited

U.S. PATENT DOCUMENTS

| | | | |
|---|---|---|---|
| 7,944,445 | B1 | 5/2011 | Schorr |
| 2002/0109685 | A1 | 8/2002 | Nakagawa et al. |
| 2002/0158887 | A1 | 10/2002 | Samra et al. |
| 2003/0011601 | A1 | 1/2003 | Itoh et al. |
| 2004/0181544 | A1* | 9/2004 | Anderson ............... 707/102 |
| 2005/0015377 | A1 | 1/2005 | Wan |
| 2005/0131927 | A1 | 6/2005 | Fildebrandt et al. |
| 2005/0138057 | A1 | 6/2005 | Bender et al. |
| 2006/0059461 | A1 | 3/2006 | Baker et al. |
| 2006/0062157 | A1 | 3/2006 | Yamamoto |
| 2006/0075387 | A1 | 4/2006 | Martin et al. |
| 2006/0150169 | A1 | 7/2006 | Cook et al. |
| 2006/0173957 | A1 | 8/2006 | Robinson et al. |
| 2006/0265664 | A1 | 11/2006 | Simons et al. |
| 2007/0022000 | A1 | 1/2007 | Bodart et al. |
| 2007/0132767 | A1 | 6/2007 | Wright et al. |
| 2007/0211058 | A1 | 9/2007 | Iguchi |
| 2007/0226314 | A1 | 9/2007 | Eick et al. |
| 2008/0005677 | A1 | 1/2008 | Thompson |
| 2008/0040367 | A1 | 2/2008 | Bitonti et al. |
| 2008/0059889 | A1 | 3/2008 | Parker et al. |
| 2010/0079459 | A1 | 4/2010 | Breeds et al. |
| 2010/0079460 | A1 | 4/2010 | Breeds et al. |
| 2010/0079461 | A1 | 4/2010 | Breeds et al. |
| 2010/0083172 | A1 | 4/2010 | Breeds et al. |

OTHER PUBLICATIONS

Robyn R.Lutz and Robert M. Woodhouse; Bi-directional Analysis for Certification of Safety-Critical Software; Mar. 1, 1999; International Software Assurance Certification Conference, ISACC'99, Chantilly, VA, USA; pp. 1-9.*

Eick, S. G. et al., "Thin Client Visualization," IEEE Symposium on Visual Analytics Science and Technology 2007, Oct. 2007, pp. 1-13, Sacramento, CA.

yWorks GmbH, "yWords-yEd/yFiles API," http://www.yworks.com/en/index.html, Aug. 2006, 1 page, USA.

ILOG, Inc., "ILOG-Visualisation Server," http://www.ilog.com/products/server/, Aug. 2000, 1 page, USA.

Olsson, T., "CSS Diagrams or Things to Do With CSS When Your Bored at Work or Look Ma'—No Images," Dec. 2003, pp. 1-9, http://www.surfare.net/~toolman/temp/diagram.html.

Rubin, D. L. et al., "Protégé: A Tool for Managing and Using Technology in Radiology Applications," Journal of Digital Imaging, Aug. 9, 2007, pp. 34-46, Stanford, CA.

Goyal et al., "RDF Gravity (RDF Graph Visualization Tool)," Knowledge Information Systems Group, Salzburg Research, Austria, Sep. 2004, 2 pages.

Huang et al., "A Framework of Filtering, Clustering and Dynamic Layout Graphics for Visualization," 28th Australasian Computer Science Conference (ACSC2005), Jan. 2005, pp. 87-96, University of Newcastle, Australia.

Lee et al., "InfoVis 2004: Understanding Eight Years of InfoVis Conferences using PaperLens," Proceedings of the IEEE Symposium on Information Visualization 2004, Nov. 2004, 7 pages.

Sprague, Alan P., "A Parallel Algorithm to Construct a Dominance Graph on Nonoverlapping Rectangles," International Journal of Parallel Programming, Springer, Netherlands, May 1992, pp. 303-312, vol. 21, No. 4.

Lin, Y.T., "A Customizable SVG Graph Visualization Engine," Oct. 2007, 9 pages, http://web.archive.org/web/20071012164019/http://www.svgopen.org/papers/CustomizableSVG-GraphVisualizationEngine/, Victoria, CA.

Abslnt Angewandte Informantik GmbH, "aiSee: Command Line Options," May 16, 2007, 3 pages, http://www.aisee.com/options/6.htm.

Kim et al., "A Graph of Change Impact Analysis for Distributed Object-Oriented Software," 1999 IEEE International Fuzzy Systems Conference Proceedings, Aug. 1999, pp. 1137-1141, vol. 2, Seoul, South Korea.

Fyson, J. M. et al., "Using Application Understanding to Support Impact Analysis," Journal of Software Maintenance: Research and Practice, Mar. 1998, pp. 93-110, vol. 10, Issue 2, John Wiley & Sons, Ltd., New York, NY.

Barros, S. et al, "Supporting Impact Analysis: A Semi-Automated Technique and Associated Tool," Proceedings of the 11th International Conference on Software Maintenance, Oct. 1995, pp. 42-51, Opio, France.

Netisopakul, P., "Visualizing Dynamic Objects in Object-Oriented Program," SCI 2003. 7th World Multiconference on Systemics, Cybernetics, and Informatics Proceedings, 2003, pp. 321-325, vol. 13, IIIS, Orlando, Florida. (Abstract only).

The Eclipse Foundation, "ispace-A Scalable Dependency Visualization System for Java," discussed at http://www.eclipseplugincentral.com/Web_Links-index-req-viewlink-cid-843.html, web page titled Eclipse Plugins Central; Jan. 10, 2007, 3 pages.

Ispace Team, "ispacelspace—User Guide Browse," Jan. 2007, 4 pages, http://ispace.stribor.de/index.php?n=lspace.UserGuide.

Marshall, M.S. et al., "An Object-Oriented Design for Graph Visualization," Software: Practice and Experience, Jul. 2001, pp. 739-756, vol. 31, No. 8, John Wiley & Sons, Ltd., New York, NY.

U.S. Final Office Action for U.S. Appl. No. 12/243,883 mailed Nov. 1, 2011.

U.S. Final Office Action for U.S. Appl. No. 12/243,894 mailed Oct. 31, 2011.

U.S. Non-Final Office Action for U.S. Appl. No. 12/243,899 mailed Nov. 1, 2011.

U.S. Non-Final Office Action for U.S. Appl. No. 12/243,883 mailed Jul. 8, 2011.

U.S. Advisory Action for U.S. Appl. No. 12/243,883 mailed Jan. 6, 2012.

U.S. Non-Final Office Action for U.S. Appl. No. 12/243,894 mailed Jul. 13, 2011.

U.S. Advisory Action for U.S. Appl. No. 12/243,894 mailed Jan. 10, 2012.

U.S. Notice of Allowance for U.S. Appl. No. 12/243,894 mailed Feb. 3, 2012.

U.S. Notice of Allowance for U.S. Appl. No. 12/243,894 mailed Feb. 6, 2012.

U.S. Non-Final Office Action for U.S. Appl. No. 12/243,899 mailed Jul. 21, 2011.

U.S. Advisory Action for U.S. Appl. No. 12/243,899 mailed Jan. 6, 2012.

U.S. Non-Final Office Action for U.S. Appl. No. 12/243,902 mailed Aug. 12, 2011.

U.S. Final Office Action for U.S. Appl. No. 12/243,902 mailed Dec. 13, 2011.

U.S. Advisory Action for U.S. Appl. No. 12/243,902 mailed Feb. 21, 2012.

U.S. Non-Final Office Action for U.S. Appl. No. 12/243,883 mailed Apr. 24, 2013.

U.S. Non-Final Office Action for U.S. Appl. No. 12/243,899 mailed Apr. 24, 2013.

U.S. Non-Final Office Action for U.S. Appl. No. 12/243,902 mailed Jul. 9, 2013.

* cited by examiner

WSDL Documents

This is the collection of WSDL documents present in the registry.

⊞ Preferences

| Select | Name ⇕ | Graph | Description |
|---|---|---|---|
| ☐ | Address.wsdl | ▦ | ~31i |
| ☐ | AmazonWebServices.xml | ▦ | |
| ☐ | basic.wsdl | ▦ | |
| ☐ | BigEcho.wsdl | ▦ | |
| ☐ | Echo.wsdl | ▦ | |
| ☐ | Echo2.wsdl | ▦ | |
| ☐ | Echodbcs.wsdl | ▦ | |
| ☐ | Export1_BigEchoHttp_Service.wsdl | ▦ | |
| ☐ | LibraryBookManager.wsdl | ▦ | |
| ☐ | SOAP_HTTP_Export_BigEchoHttp_Service.wsdl | ▦ | |
| ☐ | SOAP_JMS_Export_BigEchoJms_Service.wsdl | ▦ | |
| ☐ | ValidateInsurancePolicyBinding.wsdl | ▦ | |
| ☐ | ValidateInsurancePolicyInterface.wsdl | ▦ | |
| ☐ | ValidateInsurancePolicyProductionService.wsdl | ▦ | |
| Total: 14 | | | |

Buttons: Load Documents, Delete, Add Property, Add Relationship

FIG. 3

WSDL Document

WSDL Documents > Address.wsdl

Details of the Address.wsdl WSDL document.

| Details | Content | Impact Analysis | Governance |

General Properties

Name
Address.wsdl

Location
Address.wsdl

Description

Namespace
http://address.jaxrpc.samples

Owner
UNAUTHENTICATED

Version

Last modified
Thursday, 20 September 2007 11:10:39 B

Encoding
UTF-8

Additional Properties

- Port Types
- Bindings
- Services
- Properties

Relationships

- Graphical View
- Imported Schemas
- Included Schemas
- Imported WSDLs
- Policies
- Policy Attachments
- Custom Relationships
- Classifications

[ Apply ] [ OK ] [ Reset ] [ Cancel ]

FIG. 4

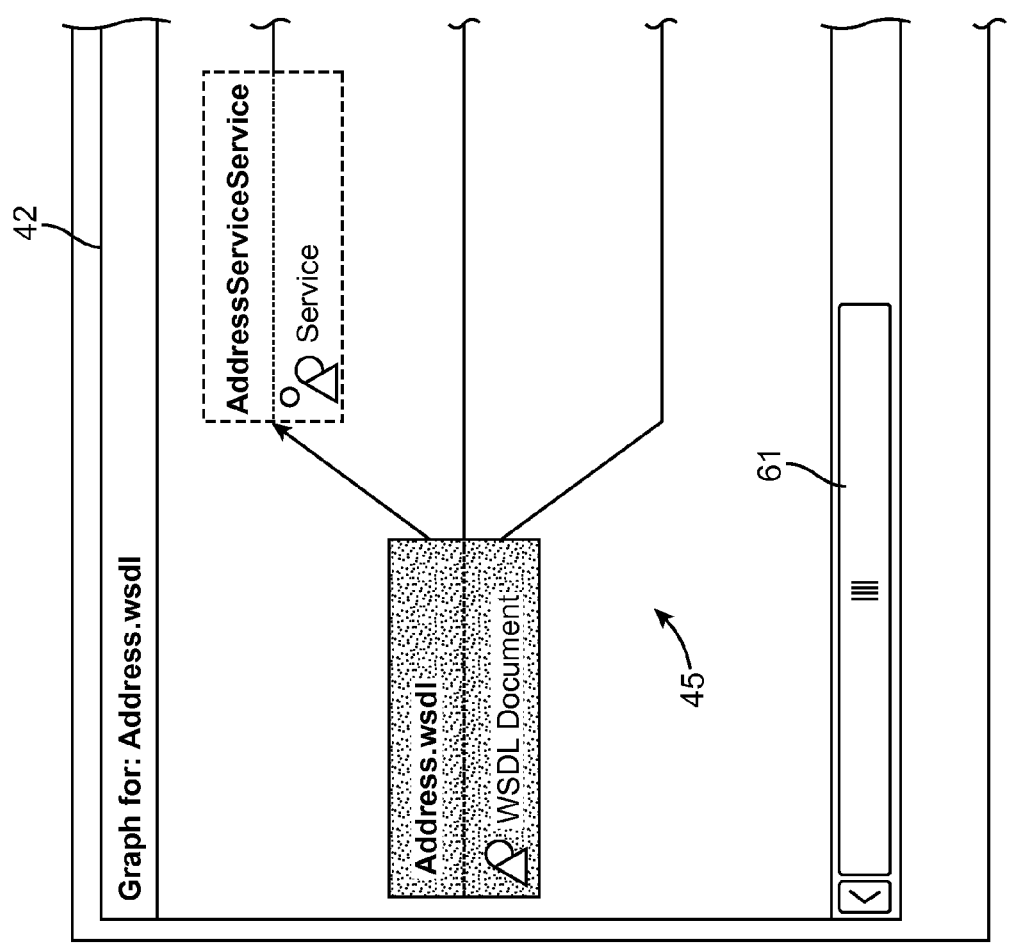

FIG. 14

XSD Documents > http.tonawanda.sr.ibm.com.Insurance.xsd
Details of the http.tonawanda.sr.ibm.com.Insurance.xsd XML schema definition document.

| Details | Content | Impact Analysis | Governance |

Impact Analysis

Specify dependency relationship options for performing impact analysis.

Impact Analysis Options

☑ Include entities this entity depends on

☑ Include entities that depend on this entity

Dependency depth:
`5`

Built-in relationships
```
Derived entity reference to its source document
WSDL or XSD document to imported XSD document
WSDL or XSD document to included XSD document
WSDL or XSD document to redefined XSD document
WSDL document to imported WSDL document
Entity reference to classification
Entity relationship to predecessor
Non-derived entity reference to its template
WSDL service to WSDL port
WSDL port to WSDL binding
WSDL port to SOAP address
WSDL binding to SOAP binding
```

Custom relationships
```
libraries
MyRelationship
RelationshipObject
derf
libraryFilesRAL
libraryFilesREL
libraryFilesWSDL
libraryFilesXSD
relationship_eight
relationship_five
relationship_four
relationship_one
```

Display Options

◉ Display results as a graph
○ Display results as a table

[Go]

XSD Documents > http.tonawanda.sr.ibm.com.Insurance.xsd > Impact Analysis
This is the collection of entities that may be impacted by changes to the entity XML sch
⊞ Preferences

| Name ⇕ | Graph | Description ⇕ | Object Type ⇕ | Version ⇕ |
|---|---|---|---|---|
| AddressBO.xsd | ⊟ | | XML schema definition document | |
| AdjusterBO.xsd | ⊟ | | XML schema definition document | |
| ClaimBO.xsd | ⊟ | | XML schema definition document | |
| ContactBO.xsd | ⊟ | | XML schema definition document | |
| CustomerBO.xsd | ⊟ | | XML schema definition document | |
| http.tonawanda.sr.ibm.com.base.xsd | ⊟ | | XML schema definition document | |
| InsurancePolicyBO.xsd | ⊟ | | XML schema definition document | |
| policy | ⊟ | | part | |
| TrueOrFalseBO.xsd | ⊟ | | XML schema definition document | |
| validate | ⊟ | | operation | |
| ValidateInsurancePolicy | ⊟ | | port type | |
| ValidateInsurancePolicyBinding.wsdl | ⊟ | | WSDL document | |
| ValidateInsurancePolicyInterface.wsdl | ⊟ | | WSDL document | |
| validationRequest | ⊟ | | message | |
| validationResponse | ⊟ | | message | |
| validationReturn | ⊟ | | part | |
| Total: 16 | | | | |

FIG. 15A

Results ema definition document http.tonawanda.sr.ibm.Insurance.xsd.

| Impact Relationship | Relationship Name | Originating Object |
|---|---|---|
| Depends on | includedXSDs | http.tonawanda.sr.ibm.com.base.xsd |
| Depends on | includedXSDs | http.tonawanda.sr.ibm.com.Insurance.xsd |
| Depends on | includedXSDs | http.tonawanda.sr.ibm.com.Insurance.xsd |
| Depends on | includedXSDs | http.tonawanda.sr.ibm.com.base.xsd |
| Depends on | includedXSDs | http.tonawanda.sr.ibm.com.base.xsd |
| Depends on | importedXSDs | InsurancePolicyBO.xsd |
| Depends on | includedXSDs | http.tonawanda.sr.ibm.com.Insurance.xsd |
| Depended on by | document | ValidateInsurancePolicyInterface.wsdl |
| Depends on | includedXSDs | http.tonawanda.sr.ibm.com.base.xsd |
| Depended on by | document | ValidateInsurancePolicyInterface.wsdl |
| Depended on by | document | ValidateInsurancePolicyInterface.wsdl |
| Depended on by | importedWSDLs | ValidateInsurancePolicyInterface.wsdl |
| Depended on by | importedWSDLs | http.tonawanda.sr.ibm.com.Insurance.xsd |
| Depended on by | document | ValidateInsurancePolicyInterface.wsdl |
| Depended on by | document | ValidateInsurancePolicyInterface.wsdl |
| Depended on by | document | ValidateInsurancePolicyInterface.wsdl |

FIG. 15B

METHOD AND SYSTEM FOR GENERATING AND DISPLAYING AN INTERACTIVE DYNAMIC VIEW OF BI-DIRECTIONAL IMPACT ANALYSIS RESULTS FOR MULTIPLY CONNECTED OBJECTS

BACKGROUND OF THE INVENTION

1. Field of the Invention

The invention relates generally to graphical display of data, and in particular, to displaying a graph view of multiply connected objects.

2. Background Information

Visualization of and interaction with data helps users quickly understand the types of data available and their inter-relationships. Often, sets of data are presented as lists, or tables with columns, depicting specific attributes of each instance of data. Analyzing and understanding the nature and state of units of data, and appreciating any subtle relationships and connections therebetween, can be difficult and time consuming. For example, in a screen display, large sets of textual data cannot fit on a single display without the user having to scroll or page, whereby a user cannot retain a view of all the data at once.

A conventional solution is to draw a graph of objects with lines indicating relationships between pairs of objects, and some arbitrary shape representing each instance of an object. Typically, the scale of the graph can be controlled, and the data arranged in such a way that all data or a selection of data can be viewed in a single screen. An example of this is a unified modeling language (UML) editor, which allows users to examine a set of object classes and the relationships between them. The user can move around the graph, zoom into items of interest and view details of specific classes (e.g., zoom into objects in the graph and identify relationships that exist between classes).

Impact analysis is a technique for finding the dependencies between objects. This is often used to find what objects in a system would be affected if a change occurred on a selected object. Generating and presenting a list of affected objects in tabular form does provide useful information but it can be difficult to interpret. It can be confusing to keep track of the direction of relationships, such as the difference between an object depending on the presence or state of another, or where the object is depended on by another object or objects.

Presenting object data information in a graphical format greatly enhances readability, showing relationships between objects, the direction of those relationships, to any arbitrary depth. The benefit is that all objects that would be affected by the proposed change to a single chosen object can be seen at a glance. Impact analysis typically functions by traversing relationships in the outbound direction, that is, away from the root object, to some arbitrary depth, and finding the objects at the ends of these relationships, and then by traversing relationships in a reverse direction for those objects with relationships that point towards the root object, and finding the objects at the source of these relationships. This results in a set of outbound results and a set of inbound results, with the root object being common to both.

A common approach in generating graphs suitable for presentation in such a way that the graphs are easy to read is to layout the objects in the graph as a hierarchy, where one node is the root of the graph, with descendant objects at levels of increasing depth. Graph drawing algorithms exist that can normalize and structure the data in such a way that edges span only between adjacent levels. Additionally, such algorithms can account for readability constraints such as minimizing the number of intersections of edges. See Sugiyama graph algorithm.

However, given a graph drawing algorithm that produces a hierarchical arrangement of graph nodes, and given impact analysis results for both outbound and inbound relationships, such conventional graph drawing algorithms cannot merge the two hierarchies of data into a common graph layout where there is a single root object. Further, when an object appears in both the outbound results and the inbound results, such conventional graph drawing algorithms arrange the graph and show only one instance of that object, which is an impediment in differentiating between inbound and outbound relationships.

SUMMARY OF THE INVENTION

The invention provides a method and system for generating a graph view of multiply connected objects in a computing environment. One embodiment includes: at a server, generating graph coordinate data for a dependency graph view of bi-directional impact analysis results for multiply connected objects in a data source; transmitting the graph coordinate data to a client as lightweight object data; and at the client, based on the lightweight object data, rendering an interactive dynamic dependency graph view on a user interface.

Generating graph coordinate data may further include: generating graph coordinate data for an upstream graph representing multiply connected objects that depend on the selected object; generating graph coordinate data for a downstream graph representing multiply connected objects that the selected object depends on; and merging the upstream and the downstream graph coordinate data at the selected object to generate dependency graph coordinate data with the selected object as a shared root, to transmit to the client for rendering.

The impact analysis results may include a first set of results representing upstream object dependency relationships, and a second set of results representing downstream object dependency relationships. Generating hierarchical graph coordinate data for an upstream graph may include generating graph coordinate data for the upstream graph from the first set of results representing upstream object dependency relationships. Generating hierarchical graph coordinate data for a downstream graph may include generating graph coordinate data for the downstream graph from the second set of results representing downstream object dependency relationships.

The graph coordinate data for each graph may include identification of graph objects and object dependency information. Generating graph coordinate data for a dependency graph view may further include processing one of the downstream or upstream graph data such that the dependency relationships in the second set are reversed in direction into hierarchical graph data, and then merging the upstream and the downstream graph coordinate data at the selected object to generate dependency graph coordinate data with the selected object as a shared root, to transmit to the client.

The dependency graph view may include visual elements connected by edges, such that the visual elements represent the objects and the edges represent dependency relationships between the objects. The computing environment may comprise a service registry computing environment. The client may comprise a web browser on a thin client computing module, the server may comprise a server application on a server computing module, wherein the client module and the server module may be connected via a communication link.

These and other features, aspects and advantages of the invention will become understood with reference to the following description, appended claims and accompanying figures.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIGS. 3-12 show examples of generating and interacting with a graph view, according to embodiments of the invention.

FIGS. 13-16B show examples of a process for generating an interactive view of bi-directional impact analysis results for multiply connected objects, according to embodiments of the invention.

DESCRIPTION OF THE PREFERRED EMBODIMENTS

Figure 1:
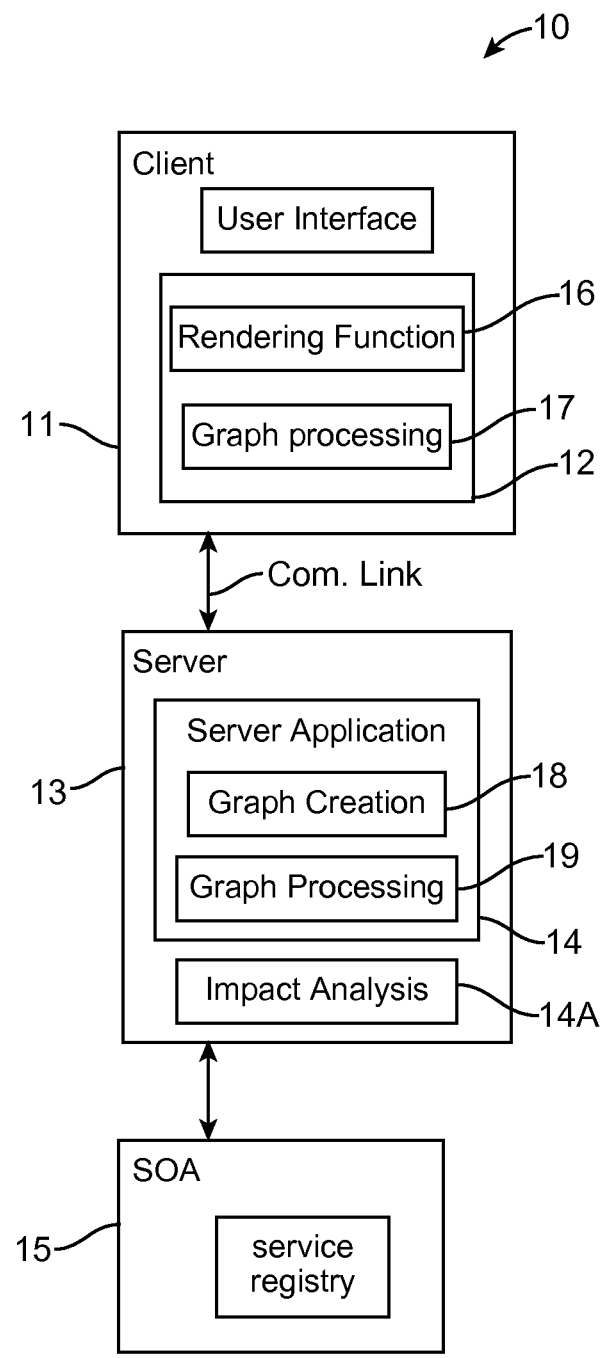
FIG. 1 shows a functional block diagram of a system for generating and displaying an interactive dynamic graph view for bi-directional impact analysis results of multiply connected objects, based on a culling of the graph, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for generating and displaying an interactive dynamic graph view of multiply connected objects. One embodiment includes generating and displaying an interactive dynamic view of bi-directional impact analysis results for multiply connected objects. Preferably, the bi-directional impact analysis results are presented in a graph view using a single hierarchical layout approach.

One embodiment involves generating graph data representing multiply connected objects at a server module, transmitting the graph data from the server module to a client module (such as web browser client) via a communication link, and then at the client module displaying an interactive dynamic graph view of the objects. The graph view content includes visual representations of the objects as shapes and object relationships as edges connecting the shapes, and may further include information about objects types and relationship types. The graph content is dynamically rendered. The graph content may be selectively displayed based on control information such as filtering based on object and/or relation types, etc.

Impact analysis generates two sets of results: a set for outbound object dependency relationship and a set for inbound object dependency relationships. The invention processes one set of results by passing the set to a hierarchical graph layout algorithm. To force the other set of results into a form with a single root where the relationships are directed away from the root object, all the edges in the second set are reversed in direction and then passed to the same hierarchical graph layout algorithm. The result is two hierarchical graphs, one of which must have its edges reversed and then it can be combined with the other graph to form a single graph with a shared root object.

A preferred implementation of the invention is in relation to registry applications, described below. A registry application manages sets of data that can be multiply inter-connected by any number of relationships, where each data object may represent some physical artifact or business unit. Users of such a registry are interested in understanding the inter-dependencies between the objects stored in the registry, such that they can quickly see the effect of changing any of the data objects on other data. It is also a convenient way of applying a common operation to multiple objects selected in the graph representation.

In the description below, first an example of generating and presenting a graph view to the user is described. Then, an example of presenting bi-directional impact analysis results in a graph view using a single hierarchical layout approach, according to an embodiment of the invention is described.

Generating Graph View

An example rendering system generates and displays an interactive dynamic graph view of multiply connected objects. The rendering system implements a rendering process for generating a dynamic graph view for illustrating, and interacting with, multiply connected objects in a web browser client. The rendering process allows a user to interact with the graph to find more information about the objects displayed or perform further actions with one or more of the objects. The system allows display of a graphical view to an end user with commonly available web browsers without the need to install plug-ins.

The system uses the capabilities of browsers and software libraries to enable data generated by server applications to be visualized as vectors that can be scaled, transformed and interacted with using vector graphics, providing users with similar quality presentation as dedicated rich client applications combined with the network efficiencies of a thin client retrieving pre-processed data from a server application. In addition, the system provides a mini-portal view of the entire graph allowing the user to track location regardless of the current scale factor of the graph. The system also provides a history of previous graph views so the user can return to previous views easily, without requiring much storage on the client and none on the server (this addresses a common problem with asynchronous browser applications where the user presses the back button to go to a previous view and then finds they are no longer on the same page).

A graph of objects is stored and managed by an application running on a server machine (i.e., server application executing on a computing device or system). The objects may or may not be interconnected. The objects have properties that allow them to be differentiated. For example, they may have a property that indicates the type of the object, or a name property that provides a human readable label. Objects may be connected to one another by relationships. A relationship originates from a source object and connects to a target object. The relationship itself may have properties to track which source and target objects it spans, and also descriptive properties such as a relationship name.

In order to view the graph of objects in a user interface, a set of relative coordinates for shapes that represent each of the objects in the graph is computed by the server application, such that the visible graph represents the structure of the graph (i.e., the objects that make up the graph and the relationships between them). This calculation may also apply constraints to improve the "readability" of the drawn graph. The constraints that affect structural and aesthetic interpretation may include: connection lines that represent relationships, should not cross; connection lines should not cross shapes that represent objects; any hierarchy in the graph should be apparent, either by position or by indicating direction of relationship; connection lines should be short; connection lines should be aligned straight (e.g., horizontal or vertical); the distance between two objects should be as short as possible.

Once the graph layout (i.e., the set of graph coordinates assigned to objects and relationships) is determined, the graph can be drawn on a user interface by the server application. For an environment where a web browser provides the user interface, the server application must make this graph coordinate data available via a HTTP request. The graph may be transformed into a bitmap image (such as a JPG or GIF format file) and displayed on the web page. The image is static and provided limited interactivity. Each bitmap image consumes storage and network bandwidth, depending on the color depth and quality of the image. Specifically, the graph could be drawn as a bitmap image by the server but that is inefficient as it causes large network load, and is not interactive. It is therefore preferably to send only the coordinates to the client wherein the client renders the graph such that users can interact with the individual elements of the graph.

Asynchronous JavaScript and XML (AJAX) describes a technology that is used to retrieve data to a client, such as a web browser for drawing graphs (no special client side code/plug-ins are required). AJAX describes a technology (i.e., a combination of technologies) where web browser clients make an asynchronous HTTP request to a server and when data is returned as Extensible Markup Language (XML) or JavaScript Object Notation (JSON), it activates an event in a JavaScript program executed within the browser. JavaScript code can be written to handle these events, and modify the current HTML page in place in some way that reflects only changes to the page rather than redrawing the entire web page.

According to an embodiment of the rendering system, history lists are used in conjunction with graph rendering and AJAX to allow previous graphs to be redrawn. Overview windows are applied to the graphs. One implementation is for accessing the data in a service registry and displaying the data in a web browser environment for a service-oriented architecture (SOA) computing environment. In a SOA environment, Service Registries contain documents that relate to services and the associated schemas, policies, etc.

One implementation using AJAX provides a lightweight system for graphic illustration of server content, in a system agnostic manner (client) while maintaining fluidic interaction. The system summarizes content as concise elements, until focus is attained and sustained on an element for illustrating full element content. The system preserves navigation context, so as to be able to return to previously visited areas of focus in a model. The system displays content of a greater volume by using a scrollable, visual overview window.

An AJAX implementation of a rendering system for drawing objects in a browser environment is described below. A graph settings data structure is utilized by the rendering system, which allows the client and server implementations to control the parameters which affect how the object graph is retrieved and presented. This includes filtering the types of objects to be shown in the graph, the types of relationships to show, the orientation of the graph (left to right or top to bottom), etc. FIG. 1 shows a functional block diagram of a rendering system 10, according to the invention. The system 10 includes a client 11 including a browser client 12, and a server 13 including a server application 14 which accesses data objects from a data source 15 (e.g., database such as a SOA service registry). At the request of the browser client 12, the server application 14 generates graphs from said objects in the data source 15, to be displayed by the browser client 12. The client 11 has a display and user input devices, and may be a computing module, a computing node, a computing device, etc. The server 14 may be, for example, a computing module, a computing node, a computing device, computing system, etc. The client 11 and the server 13 are connected via a communication link (e.g., network, Internet) for data communication. The server 13 may service multiple clients 11 according to an embodiment of the invention.

Figure 2:
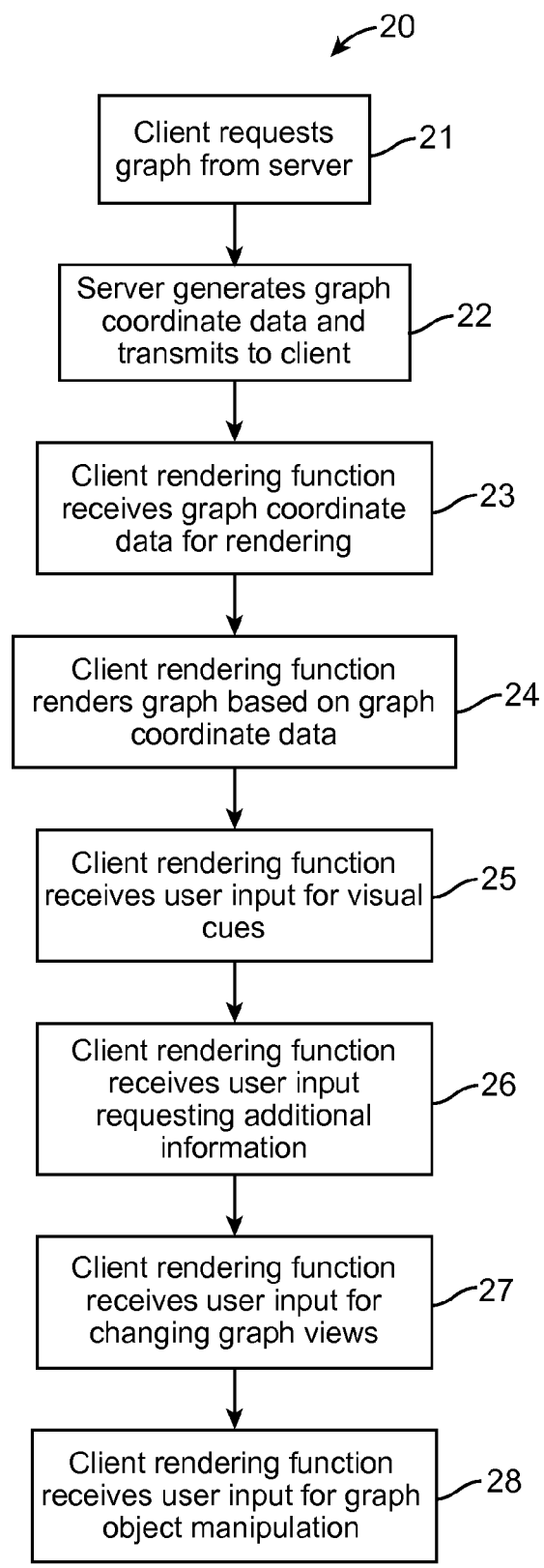
FIG. 2 shows a flowchart of a process for generating and displaying an interactive dynamic graph view of multiply connected objects, according to an embodiment of the invention.

Referring now also to FIG. 2, the rendering system 10 implements a process 20, according to an embodiment of the invention, including the process blocks described below.

Block 21: The client (e.g., browser client) requests a graph view from the server application.

Block 22: The server application accesses a data source for data to be presented as a graph, and computes graph coordinates and layout. The server application may comprise a distributed server application. The data source may comprise a database or a service registry in an SOA. The server application sends the graph coordinate data to the browser client in a lightweight, standard format.

Block 23: The browser client includes event handling code to process graph coordinate data into a form suitable for display. The browser client further includes rendering code for a graph drawing function library that allows vector graphics to be drawn to any browser that supports a vector drawing format, such as Scalable Vector Graphics (SVG) or Vector Markup Language (VML). The browser client code is not dependent on any specific implementation of vector drawing capabilities in the browser, either built-in or by installed plug-in.

Block 24: The browser client code processes the received graph coordinate data by drawing shapes (e.g., rectangles) where an object in the graph is to appear, connects those shapes together where a relationship exists and indicates direction with an arrowhead. The browser client code then appends labels on objects and relationships where such properties have been provided by the server application. The graph coordinates are scaled to fit in the available graph drawing area, or to match the scale factor requested by a user.

Block 25: The browser client code then determines when the mouse cursor (e.g., moved by the user) is over any shape or connection in the graph and may provide additional visual cues (e.g., highlighting shapes and connections in a different color or style, or showing additional information about an object).

Block 26: The browser client code determines when the user "clicks" an object by moving the mouse cursor over the object and clicking the mouse button. This action results in a behavior determined by the application programmer (e.g., selection of the object or objects, ready for some other action to be chosen and applied, etc.).

Block 27: The browser client code allows the drawing canvas to be "dragged" around the visible drawing area such that the graph contents are moved correspondingly. The user moves the mouse cursor to an area where no objects have been drawn and holds down the mouse button while moving the mouse cursor. This has the effect of attaching the cursor to the drawing area and as the mouse is moved, the graph contents move correspondingly.

Block 28: The browser client code identifies (e.g., highlights) the object from which the graph drawing originates, the root object (e.g., by drawing its outline rectangle in a solid blue line). The browser client code allows selection for display of additional information. In one implementation, the browser client allows selection of objects by clicking within the shape being used to represent the object. Selection of an object is indicated by e.g., shading the object shape a different color. This indication allows the user to choose and apply an action to the currently selected objects. Further, the browser client code can provide additional information about any graph element (such as an object or a relationship) when the user hovers the mouse cursor over the element. This highlights the object under the cursor (e.g., with a yellow dotted outline) and displays a pop-up window or tooltip containing the additional information.

The above process is now described in further detail in terms of the operations of the server and the client.

When the server application receives a request from the client to generate graph coordinates and other information for a graph of a given depth starting from a specified origin (root) object having an identification ID, a graph creation function 18 (FIG. 1) of the server application discovers and maintains relationships for display as a graph.

Starting with the root object ID, the object is retrieved from the data source 15 by the graph creation function 18. The graph creation function 18 then creates a graph node with properties that are required for display (e.g., object name, type, unique ID). The graph node is added to a map of node IDs. The graph node is set as the source node (source object).

Next, the graph creation function 18 recursively traverses relationships from that object to find the next level of target objects to add to the graph, according to the settings for the graph passed from the client. The settings determine the depth of objects to be fetched and the types of relationship to be followed. Next, when a relationship is traversed, the graph creation function 18 retrieves the target objects, wherein if the object ID for a target object does not exist in the node map, a graph node is created with properties required for display of the target object (as for the source node), plus a unique ID. If the graph node does already exist, it is retrieved from the node map.

The graph creation function 18 then adds the graph nodes to an edge object. An edge object represents one or more relationships between the source object and the target object. Importantly, an edge can represent more than one relationship. It does so via a relationship vector object for each type of relationship connecting the source object and target object.

After an edge is created between source and target graph nodes, the graph creation function 18 sets the target nodes as source nodes in turn and their relationships traverse until the depth limit set by the graph settings object is reached. At this point, there is a set of graph node objects and a set of graph edges. This collection of data is then provided to a graph processing function 19 (FIG. 1) of the server application to transform the collection data into a set of graph objects with coordinates such that the graph meets readability constraints (i.e., the graph contents are arranged such that the connection crossings are minimized and connection lengths are reduced to reduce graph density and complexity). If relationships exist that may cause a cycle in the graph, these relationships are reversed and marked as such. This allows the entire graph to have all relationships in the forward direction (i.e., the graph flows away from the root object). This helps the layout engine arrange the objects in the graph in a hierarchical manner.

The graph processing function 19 then transforms the graph data objects into lightweight objects that can be transferred to the client 11 efficiently across the communication link. In one example, the "lightweight objects" comprise the minimal representations of objects required by a client application to render a graph and are optimized and arranged such that the client can process them quickly. When the server application 14 processes related objects to build up the graph structure, there are several properties on those objects that are only relevant in the server application context (sending these to the client consumes valuable network and memory resources). The server application 14 typically runs on a dedicated, high performance machine and preparing the data for transmission to the client relieves the client 11 of having to do any object unpacking and transformation, and has little effect on the performance of the server application 14. The role of the client application is to render the graph coordinates and respond to user input. The object graph classes are designed to avoid any duplication of data, to keep identifier strings small, and also provide mappings between related objects to assist processing of the data at the client 11. Object attributes are described only once. An edge list references the objects by ID. All object types are reduced to a unique object type ID. All relationships are reduced to a unique relationship ID. Cyclical references are avoided using data structures that deliberately separate the list of object nodes and the list of relationships between those nodes. A separate data structure provides access to the natural language support (NLS) translated text (in the client) for the names of each of the types of object and the names of each of the relationships.

The object graph is serialized (e.g., in JavaScript Object Notation (JSON) format) and sent to the client 11 from the server application 14. In one example, using JSON reduces the amount of data sent from the server 13 to client 11 compared with XML, and clients using JavaScript not need parse the data from XML elements (they are transformed into JavaScript objects on arrival at the client 11 by the browser).

At the client 11, the client code comprising a graph processing function 17 receives the received object graph data. A rendering function 16 of the client code then scales the coordinates of objects to match the display area, renders visual elements such as shapes/icons, to represent graph objects, and adds text properties. Relationships between objects are drawn as connecting lines (edges) between the shapes. When processing relationships, the rendering function inspects the relationship vectors and if they are marked as reversed, it switches the direction and draws an arrowhead in the correct direction.

The rendering function inspects each edge object and the relationship vectors associated with them. If there is more than one relationship vector in the same direction, the rendering function draws a double arrowhead, or a single arrow if there is a single relationship vector. If the relationship vector is marked as reversed, the connection line can have an arrowhead pointing in the other direction, or a separate connection drawn with a reverse pointing arrowhead.

To set up mouse event handling code when a user moves a mouse cursor over a relationship connection line, the client stores a reference ID in an attribute on the HTML element used to represent the connection line. When a mouse-over event occurs, the client can retrieve the edge data that the connection represents in order to build the list of information to display in the pop-up window or tooltip. For each relationship vector in the edge object, the client code can use the relationship ID to look up a text label for that relationship (e.g., in the locale suitable for a client web browser).

An example operation scenario of the rendering system 10 according to the above process 20 is described below.

Requesting a Graph For a Starting Object

The server application 14 provides the browser client 12 with a list of data objects from the data source 15. This list can be a predefined list of objects of the same type or the result of a search of objects that match some criteria. The user selects an object from the list, requesting a graph to be drawn. Specifically, the user selects an object (i.e., root object) from the list of available objects, requesting that a graph be drawn for the selected object. FIG. 3 shows an example of a user interface for list 30 of objects 31 from a service registry, wherein the user may request generating a graph for the object by selecting a graph icon 31i (e.g., WSDL document object) from the list 30. The user interface is displayed by the browser client. The user may be viewing a detail view of an object 31 selected from the list 30, and then requests drawing a graph for it. FIG. 4 shows an example detail view 40 for a selected WSDL document object 31 displayed by the browser client 12, wherein a user is clicking a Graphical View link 32 therein to request a graph generation process for the object 31.

When the browser client 12 request drawing a graph based on the current object, an asynchronous HTTP request is made from the browser client 12 to the web server application 14 via the communication link. The server application 14 begins processing the graph, and in the meantime the browser client 12 may, for example, display an animated icon to indicate the request is being processed.

Figure 5A:
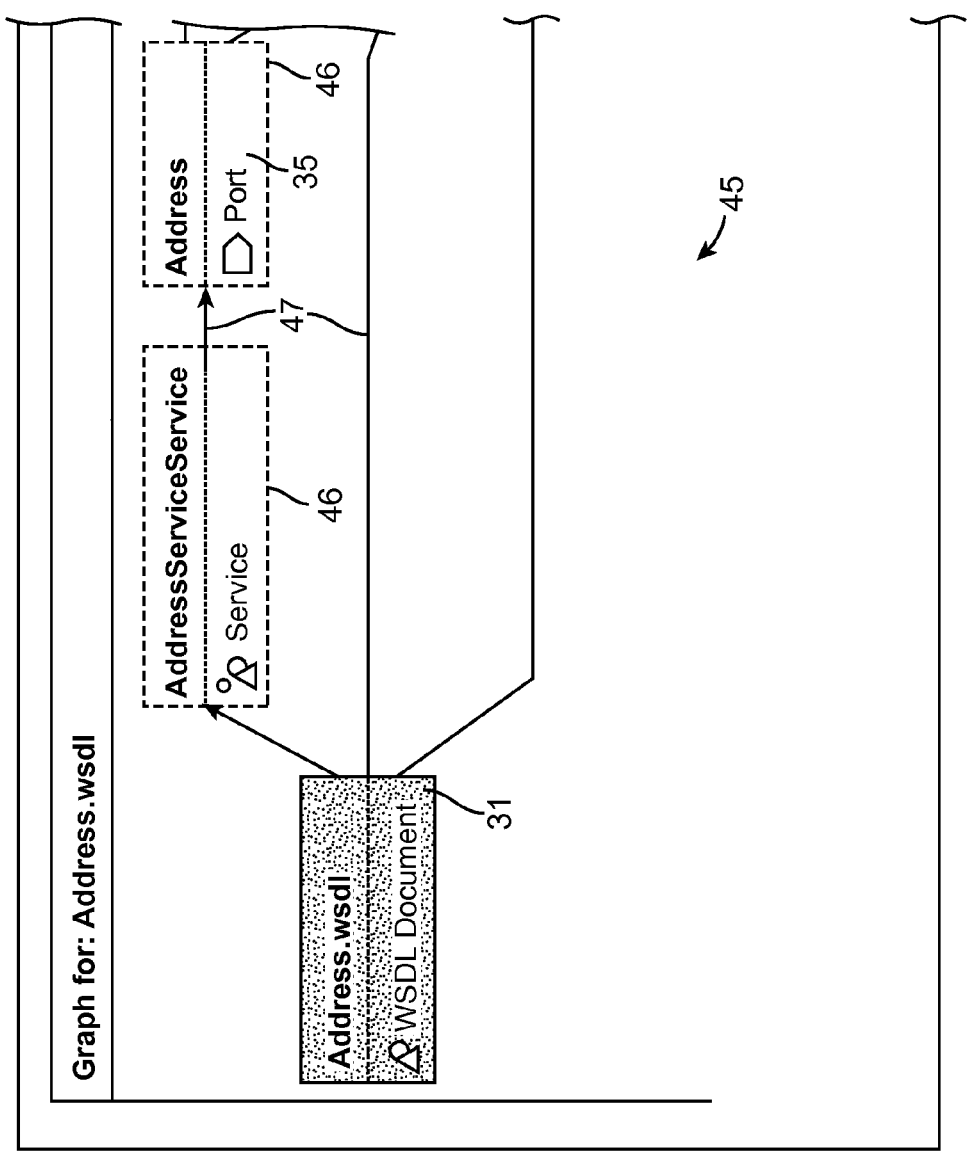
Figure 5B:
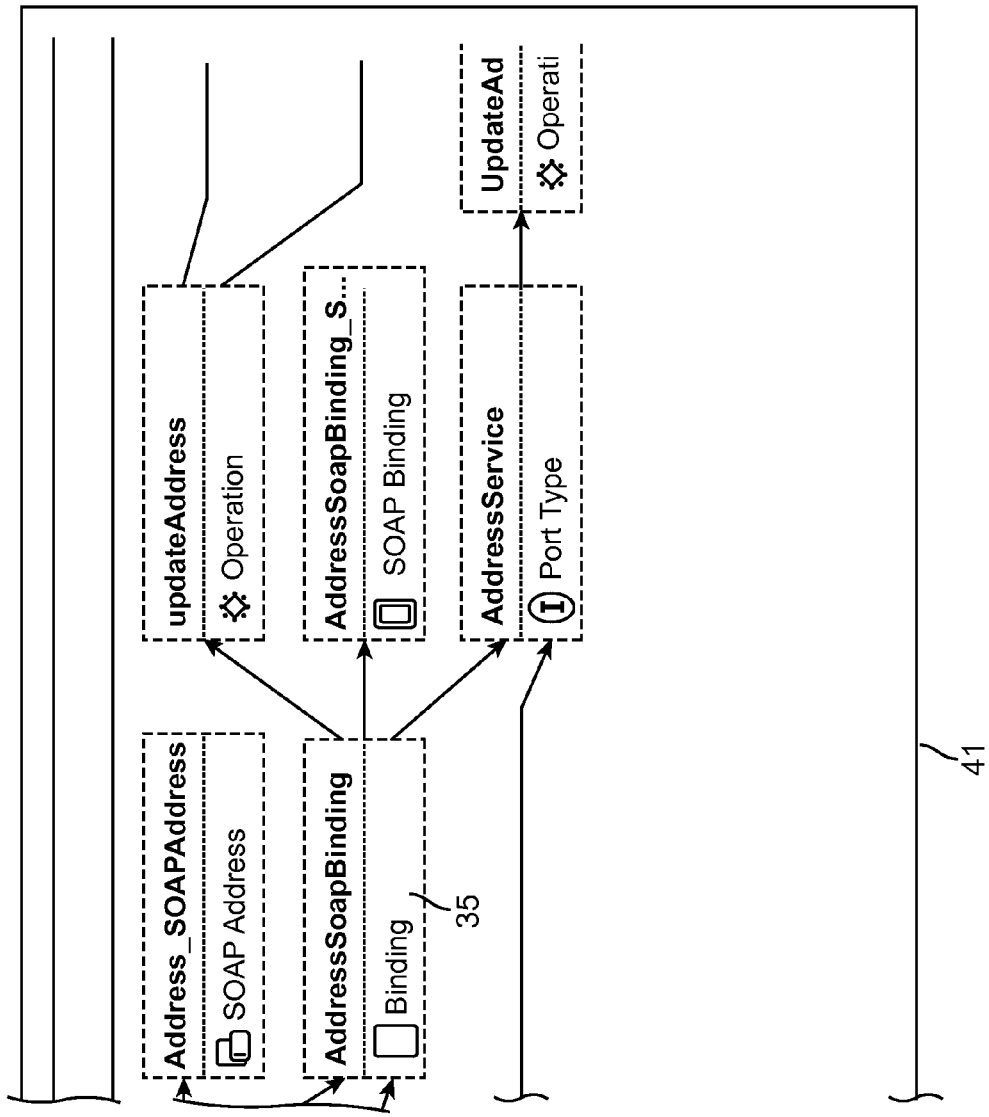

When the server application 14 completes generating the graph, it sends the graph data to the browser client 12 as XML or some other text format, and the rendering function 16 (FIG. 1) of the browser client 12 is notified accordingly. The rendering function 16 then parses the received graph data and renders a graph of the root object 31, wherein the graph includes graph elements (shapes) and connections. FIGS. 5A-B shows an example graph 45 in a window display 41 of the browser client, including shapes 46 that represent objects 35 and lines/arrows 47 that represent connections (relationships). In the following, example operational features of the rendering function 16 are described.

Object and Relationship Highlighting and Information Views

In the graph 45, by default, the root object 31 (e.g., Address.wsdl WSDL Document) is highlighted (e.g., in a different color) relative to other data objects 35 corresponding to the root object 31. In the example graph 45 (FIG. 5), all objects 31, 35, are shown as rectangles, with a text label showing the object name value. Differences between object types are indicated by a graphical icon and a text label displaying the object type. Objects are further differentiated by whether they are physical documents (e.g., as a rectangle with a solid outline, such as object 31) or objects derived from the contents of those documents (e.g., as rectangles with dotted outlines, such as objects 35). Relationships between objects 31, 35, are shown as lines 47 with arrowheads indicating the direction of the relationship.

Figure 6:
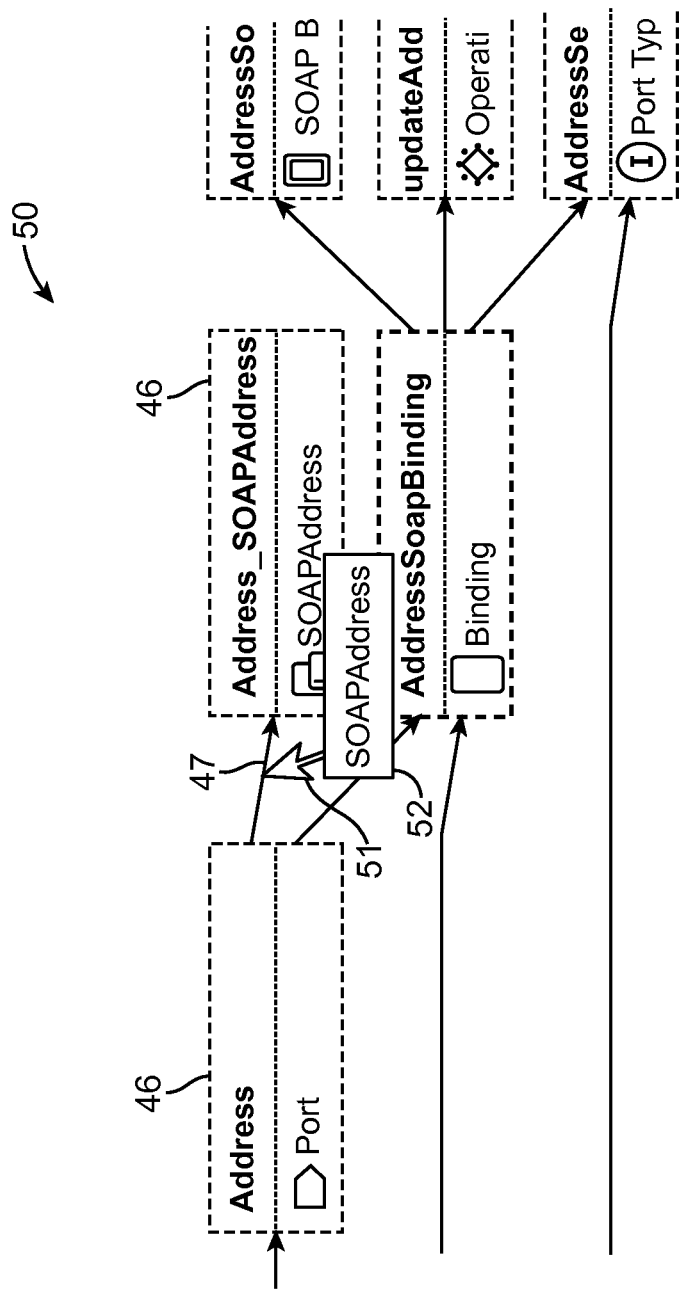
Figure 7:
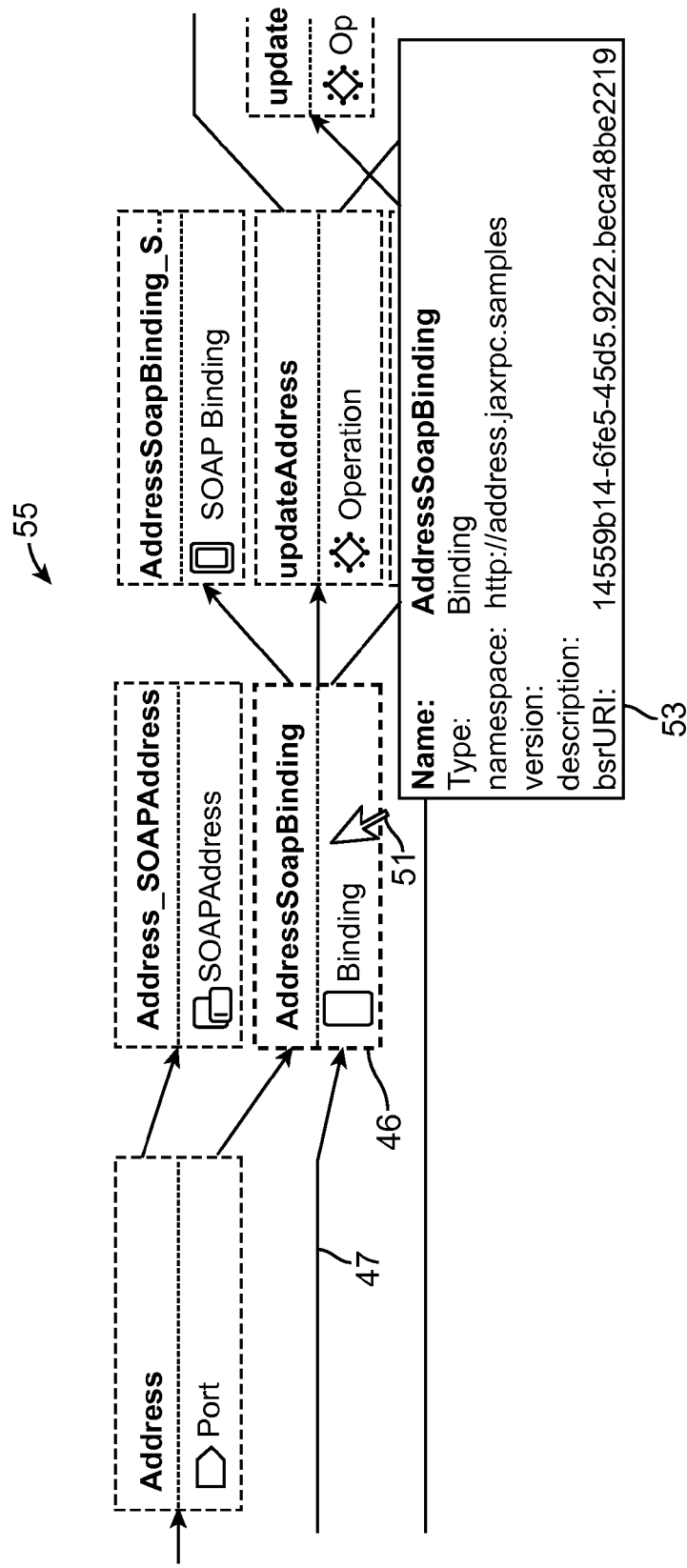

Referring to FIG. 6, an example view 50 of the graph 45 is shown. Hovering the mouse cursor 51 over a connection 47 highlights that connection (e.g., in a different color or style) and displays a pop-up window (or tooltip) 52 that includes the name (e.g., SOAPAddress) for the relationship(s). This saves the graph view from being cluttered with unnecessary labels. Highlighting the connection helps the user identify which relationship the window 52 is referring to, which is especially useful when the graph is complex with many, possibly intersecting connections 47. Referring to FIG. 7, an example view 55 of the graph 45 is shown. Hovering the mouse cursor 51 over a shape 46 representing an object, highlights the shape 46 (e.g., in a different color and/or style) and displays a pop-up window (or tooltip) 53 providing further details about the object. This saves the graph view from being cluttered with unnecessary information and labels.

Object Selection and Applying Actions

Figure 8A:
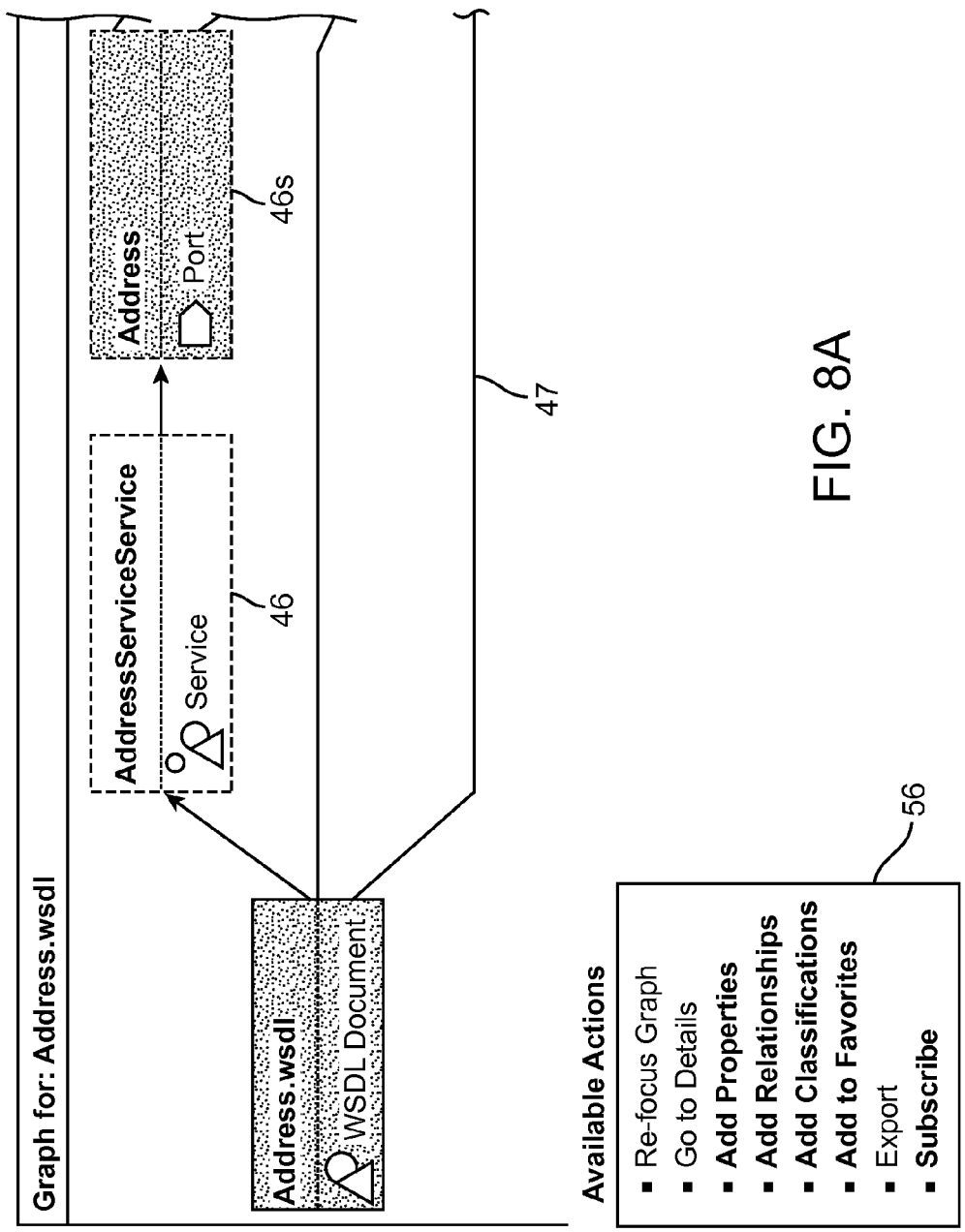
Figure 8B:
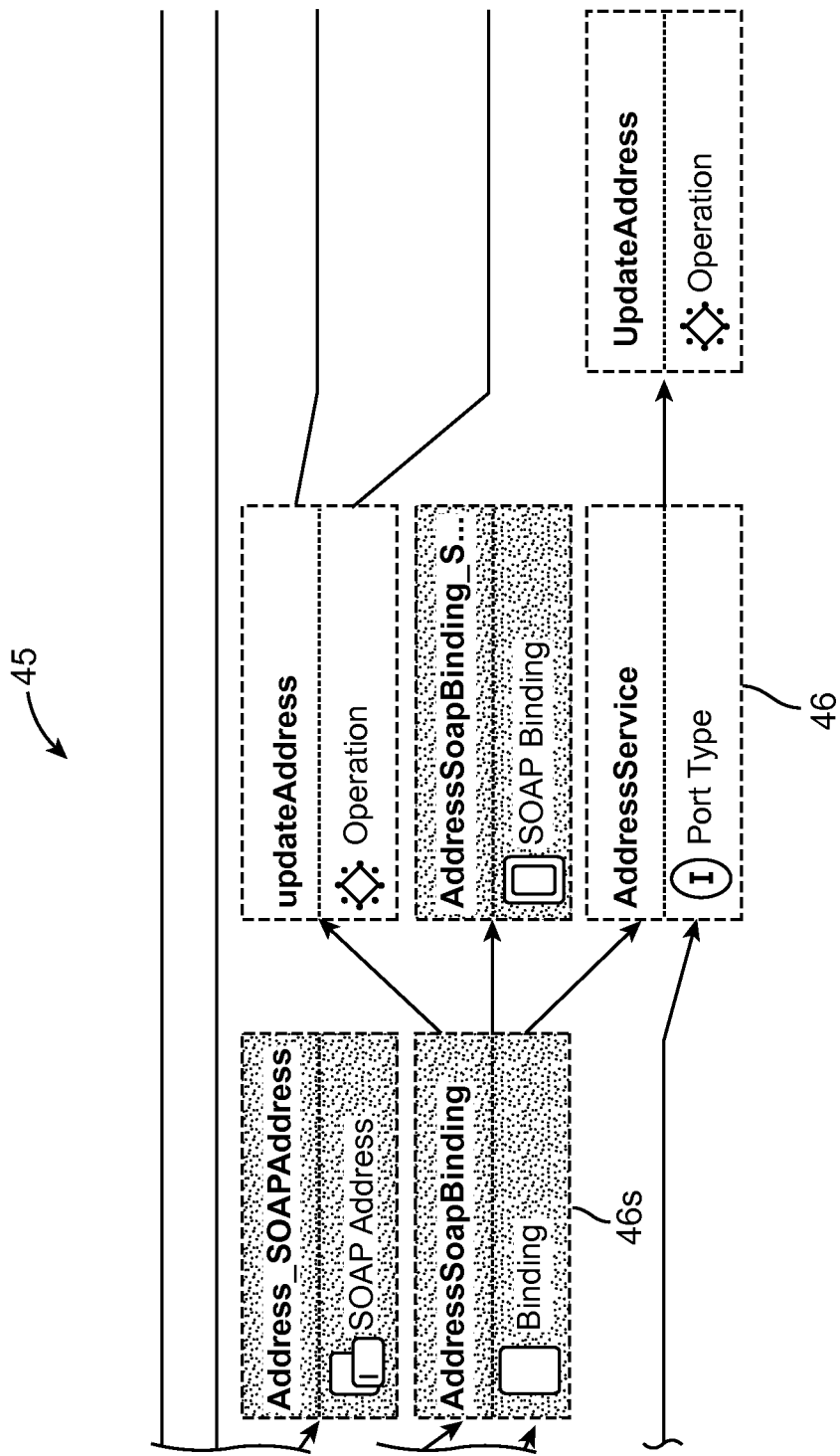

Objects in the graph 45 can be selected by clicking on their representative shapes 46. As shown by example in FIGS. 8A-B, one or more selected objects are shown by highlighted shapes 46s. To select more than one graph object, a control key can be held down as the user clicks on each of the objects they wish to add to the selection. With multiple objects selected, actions can be performed on all of the selected objects simultaneously by choosing the action from (e.g. a pop-up list 56). In one example, certain actions may not be applicable when multiple objects in the graph are selected or when certain types of object are selected (e.g., inapplicable actions are disabled and grayed out in the list 56).

Navigation Context With Scrollbars, Canvas Dragging and Viewport

Figure 9B:
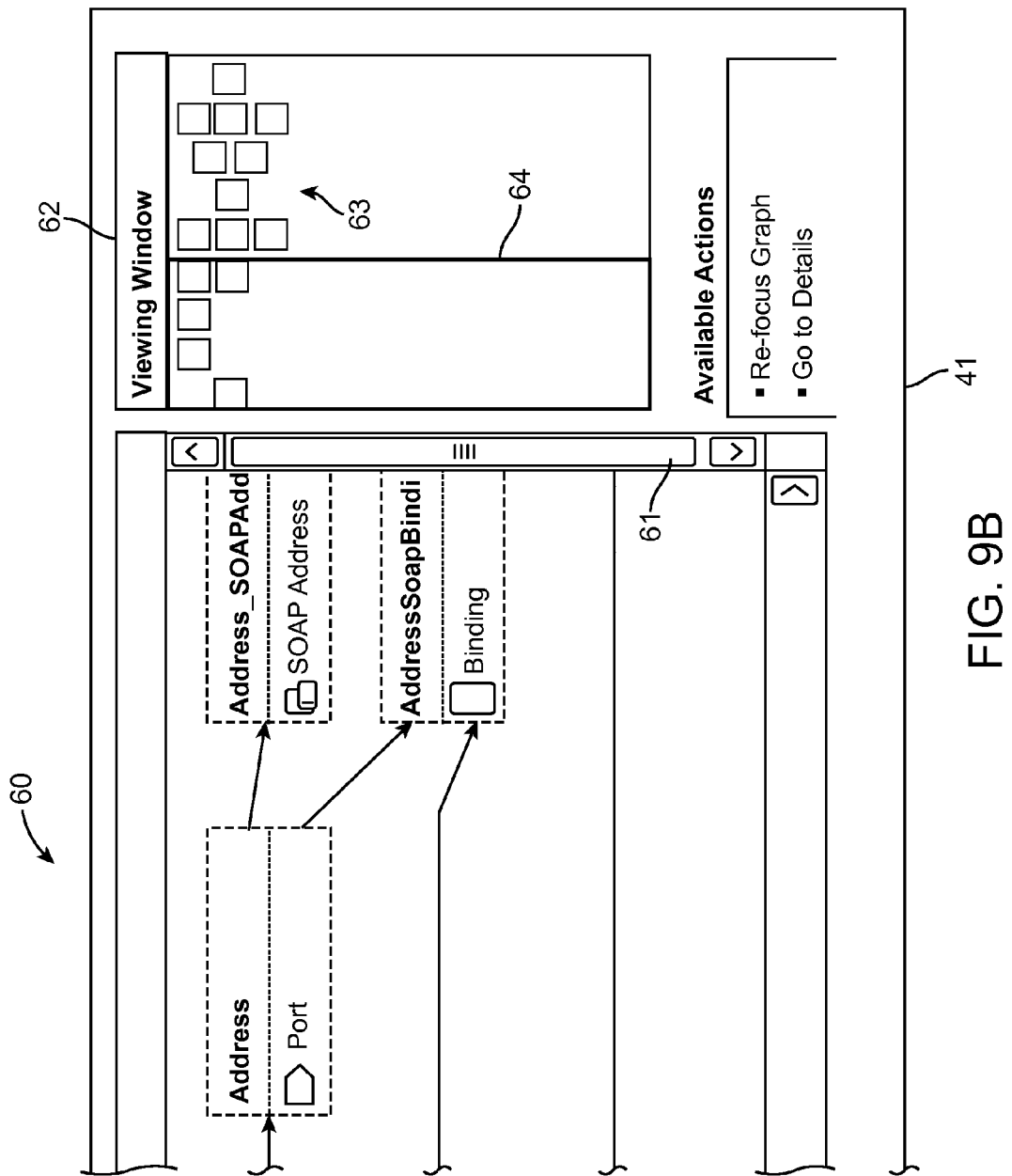

As shown by example view 60 in FIGS. 9A-B, if the extent of the graph 45 is beyond the area of a main graphical view window 41 of the browser client, then one or more scrollbars 61 are displayed. The user can move to other, hidden, areas of the graph by moving the scrollbars in the appropriate direction. In addition to using scroll bars to move around the extent of the graph, the rendering function provides the ability to drag the background drawing canvas. That is, the user can place the mouse cursor on an empty area of the display, press a mouse button and drag the graph 45 around to the desired position within a graphical view window 42. The user can control movement in the horizontal and vertical directions simultaneously. When the user is dragging the canvas, the mouse cursor changes to indicate the dragging mode. In the example shown in FIG. 9, the canvas has been dragged to the right.

Figure 10A:
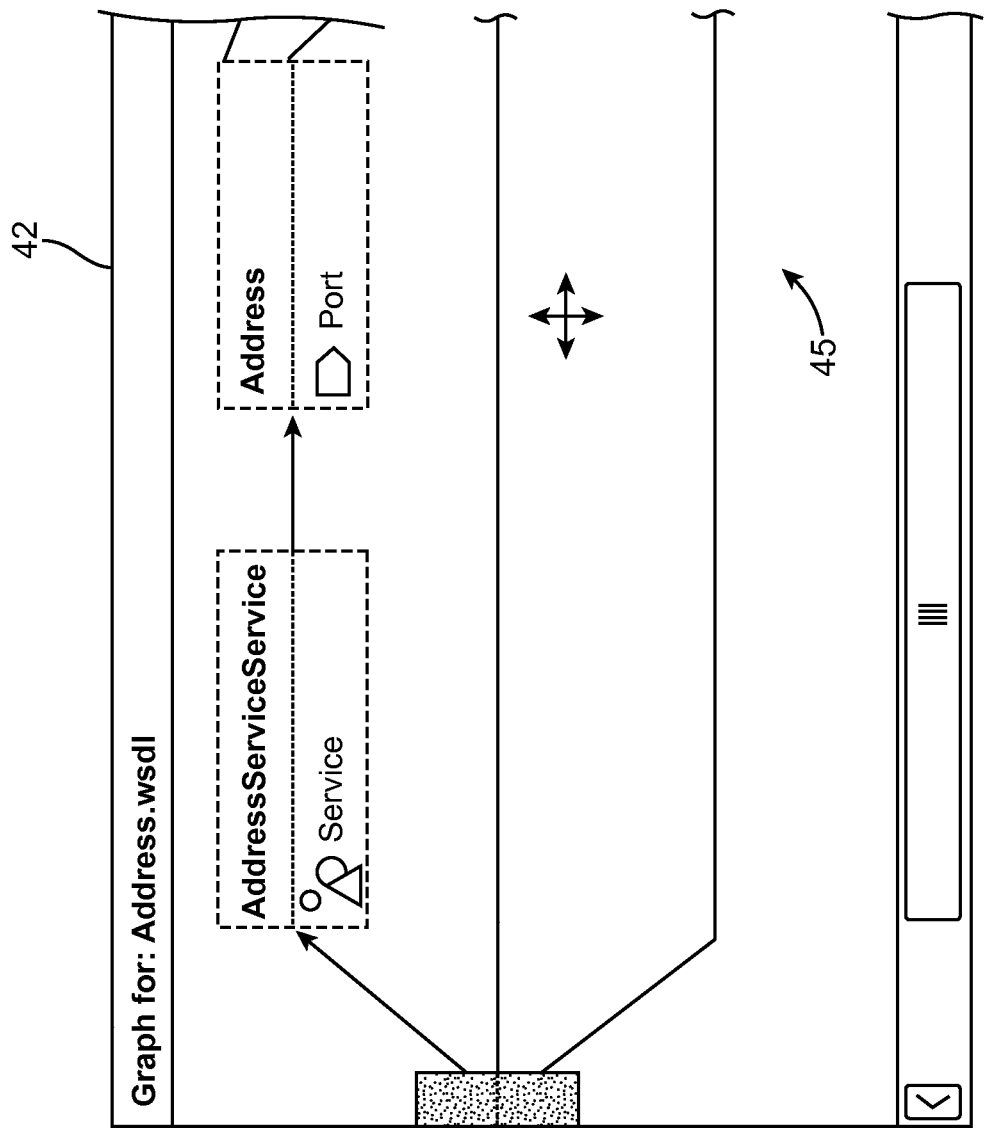
Figure 10B:
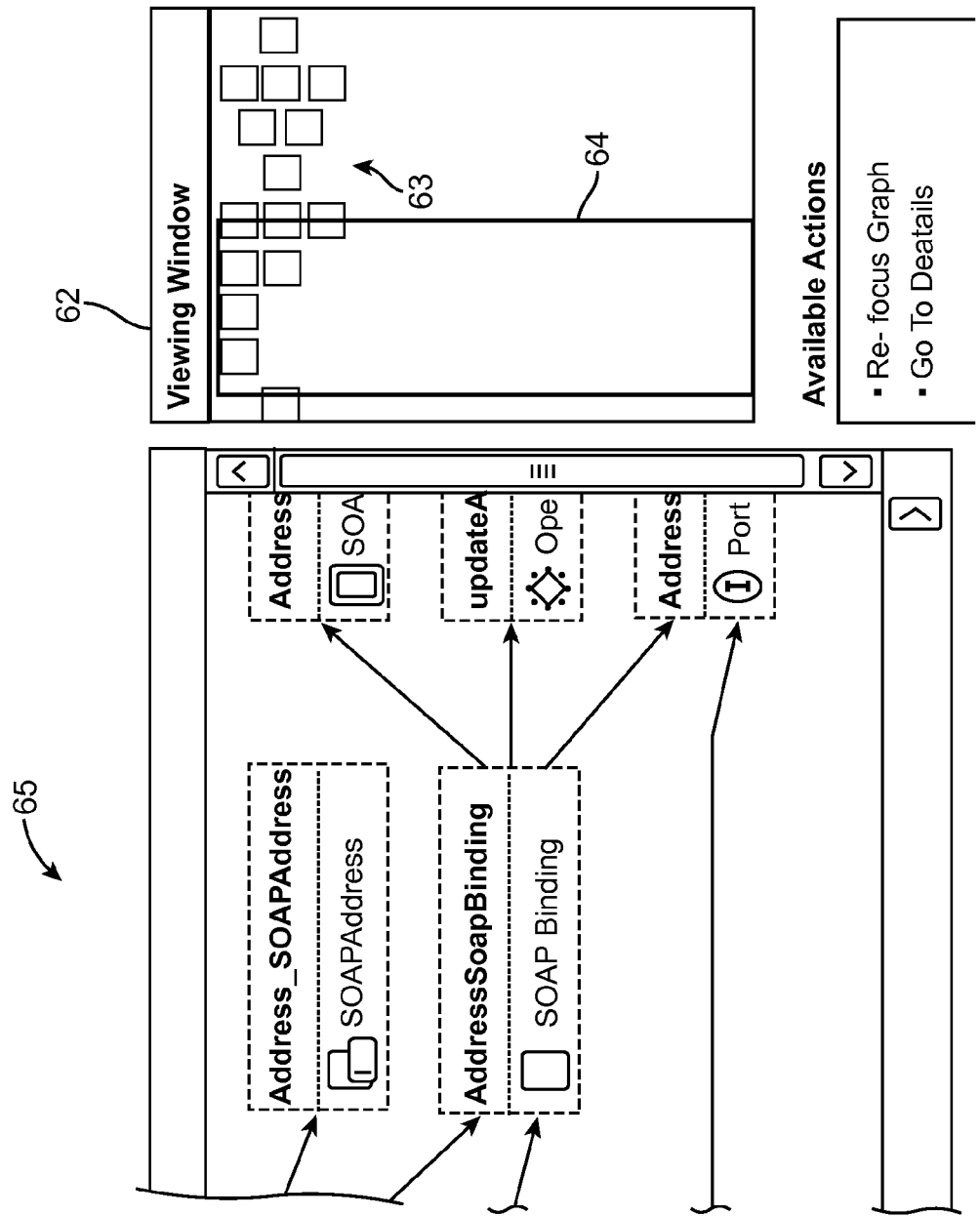

In the preferred embodiment, the rendering function implements a viewing window 62 onto the graph, to help users navigate around the graph, particularly when the graph does not fit the available display area. The example viewing window 62 represents a compact, simplified view of the entire graph structure 63, without text labels or connections. A view port window 64 (e.g., semi-transparent rectangle) within the viewing window 62 may be controlled by the user and can be dragged around in the viewing window 62 over the compact representation of the graph. Whatever underlying objects in the viewing window 62 are within the boundary of the view port 64, are displayed in the graphical view window 42 in more detail (the viewing window 62 is synchronized to the graphical view window 42). Referring to the example view 65 in FIGS. 10A-B, as the view port 64 is moved, the displayed portion of the graph 45 in the graphical view window 42 changes correspondingly.

Figure 11A:
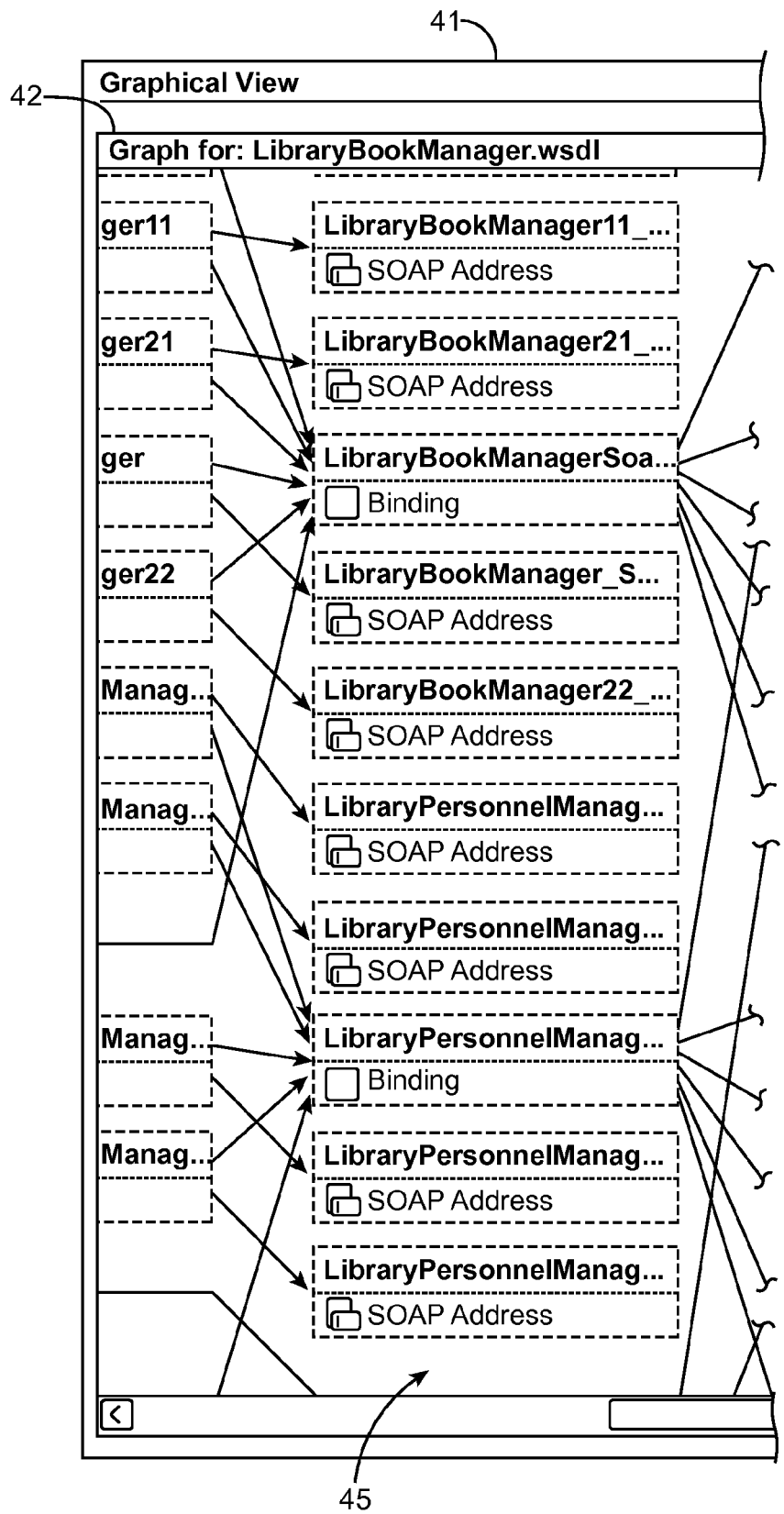
Figure 11B:
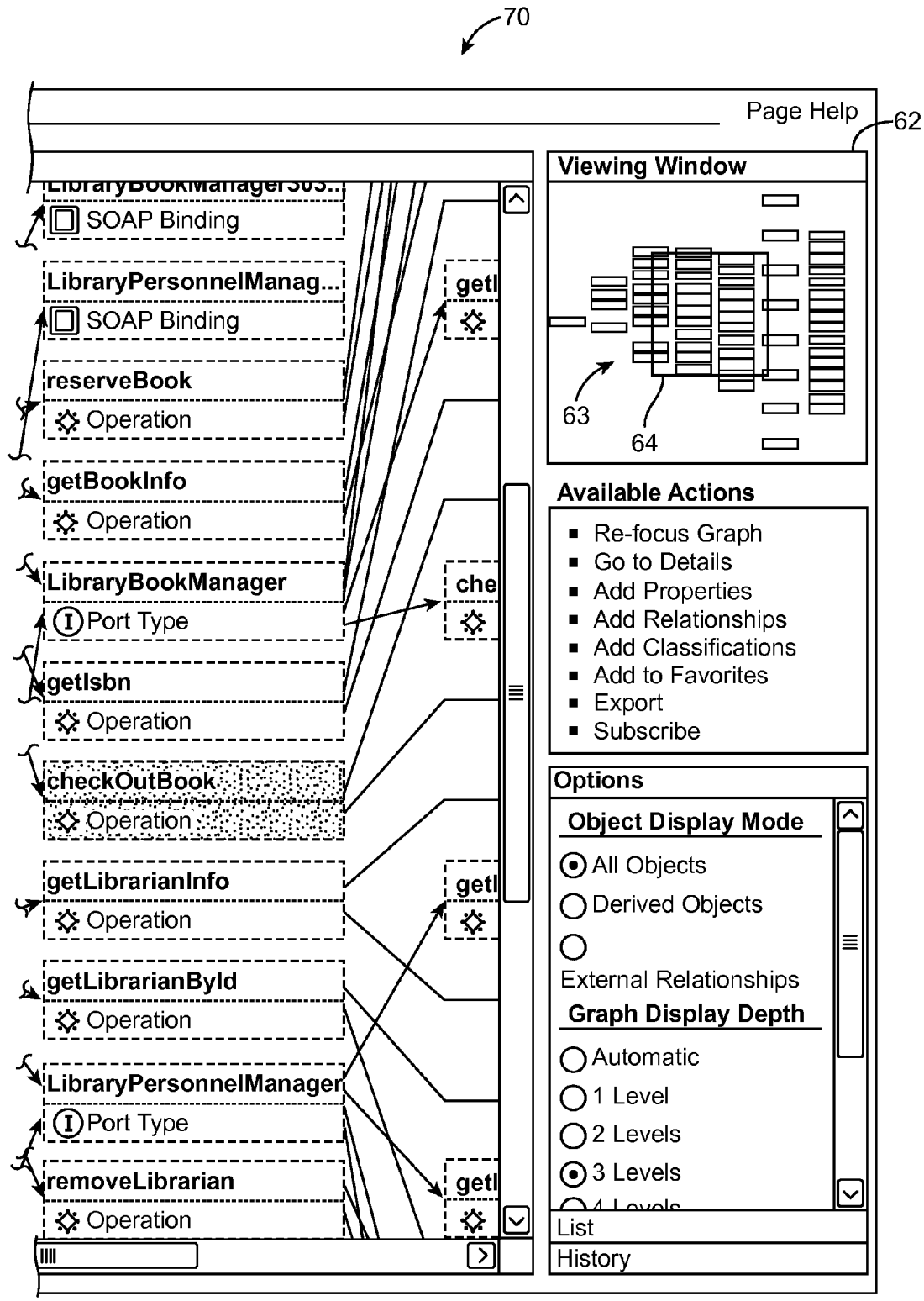

In this example, the proportions of the view port rectangle 64 match the relative proportions of the graphical view window 42. If the graphical view window 42 is wider than it is in the vertical dimension, this is reflected in the view port rectangle 64 of the viewing window 62. The size of the viewing window 62 is fixed and represents the contents of the entire contents (objects) graph structure 63. If the graphical view window 42 is sufficiently large to display all objects in the graph structure 63, the view port control 64 extends to the same size as the viewing window 62. Similarly, user movement of the scroll bars 61 on the graphical view window 62 will change the visible graph contents and this is reflected in the viewing window 62, with the view port rectangle 64 automatically moved accordingly. Dragging the background canvas of the main graphical view has the same effect. FIGS. 11A-B shows an example view 70, wherein as the view port 64 is moved, the displayed portion of the graph 45 in the graphical view window 42 changes correspondingly.

Keeping History of Previous Graph Views in a Browser Environment

In a browser environment, users are familiar with clicking the Back button to return to the previous page of data which was generated as the result of making a HTTP request to a server, and the entire page is fetched and displayed. For web pages using AJAX style technology, typically only those elements of the page that need refreshing are requested from the server asynchronously, and the relevant parts of the screen updated, without redrawing the entire page. The browser address does not change.

In the context of an embodiment of the invention, the user reaches a page which contains the object graph as well as related control elements, such as the viewing window 62, action list 56, and certain filter controls such as a view port 64. After viewing a graph 45, the user may decide to view another graph by starting at another object visible in the graph 45. The user can do so by choosing a Re-focus Graph action in the list of available actions 56, causing an asynchronous request at the server application, which in turn returns updated graph data.

The rendering function of the browser client then uses the updated graph data to render only the content of the graphical view window 42 (all other controls remain on the screen and are not refreshed). As such, less graph data need be sent from the server application to the client over the communication link, and reducing user wait time for screen updates.

Figure 12:
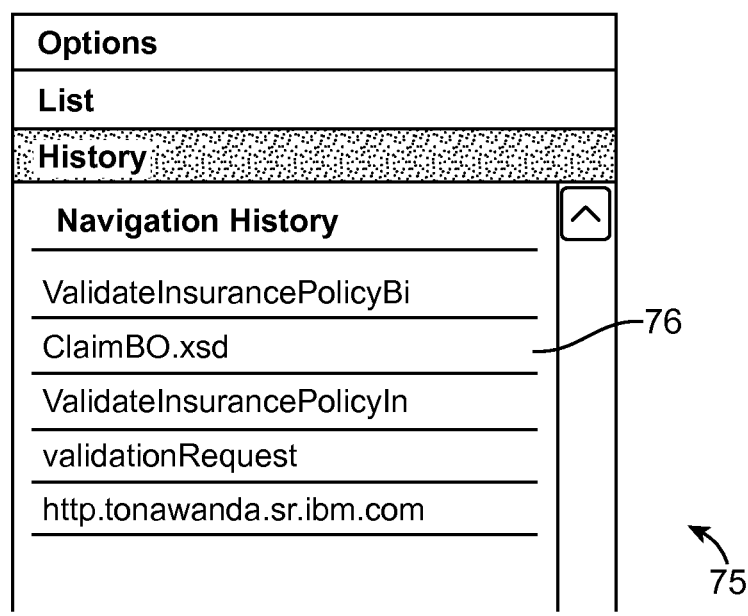

The rendering function maintains a graph navigation history which records the origin object for previous graphs, and their various display settings. FIG. 12 shows an example navigation history 75. The display settings may include, e.g., graph depth and filter settings. At any point, the user can now select a link 76 in the graph navigation history 75 to have the graph redrawn by the rendering function from that origin using the original settings.

Impact Analysis Graph View

As noted, in one embodiment the present invention further provides a rendering process for presenting bi-directional impact analysis results in a graph view using a single hierarchical layout approach.

Figure 13A:
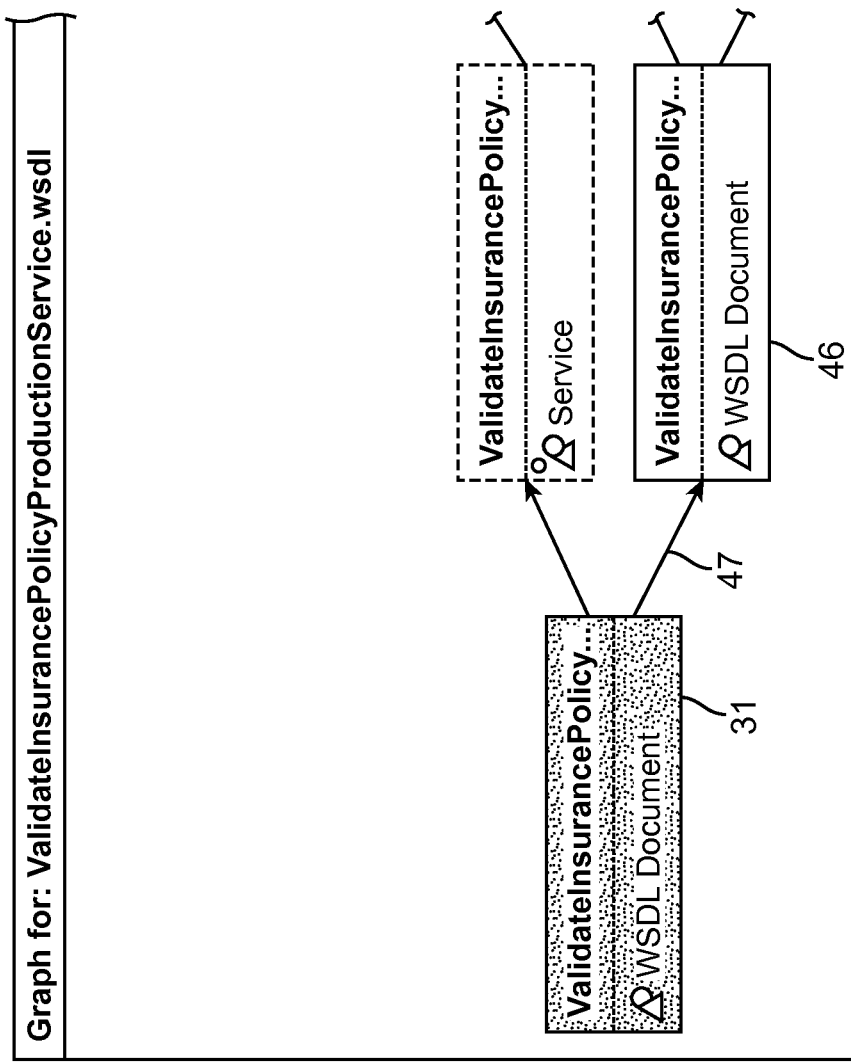
Figure 13B:
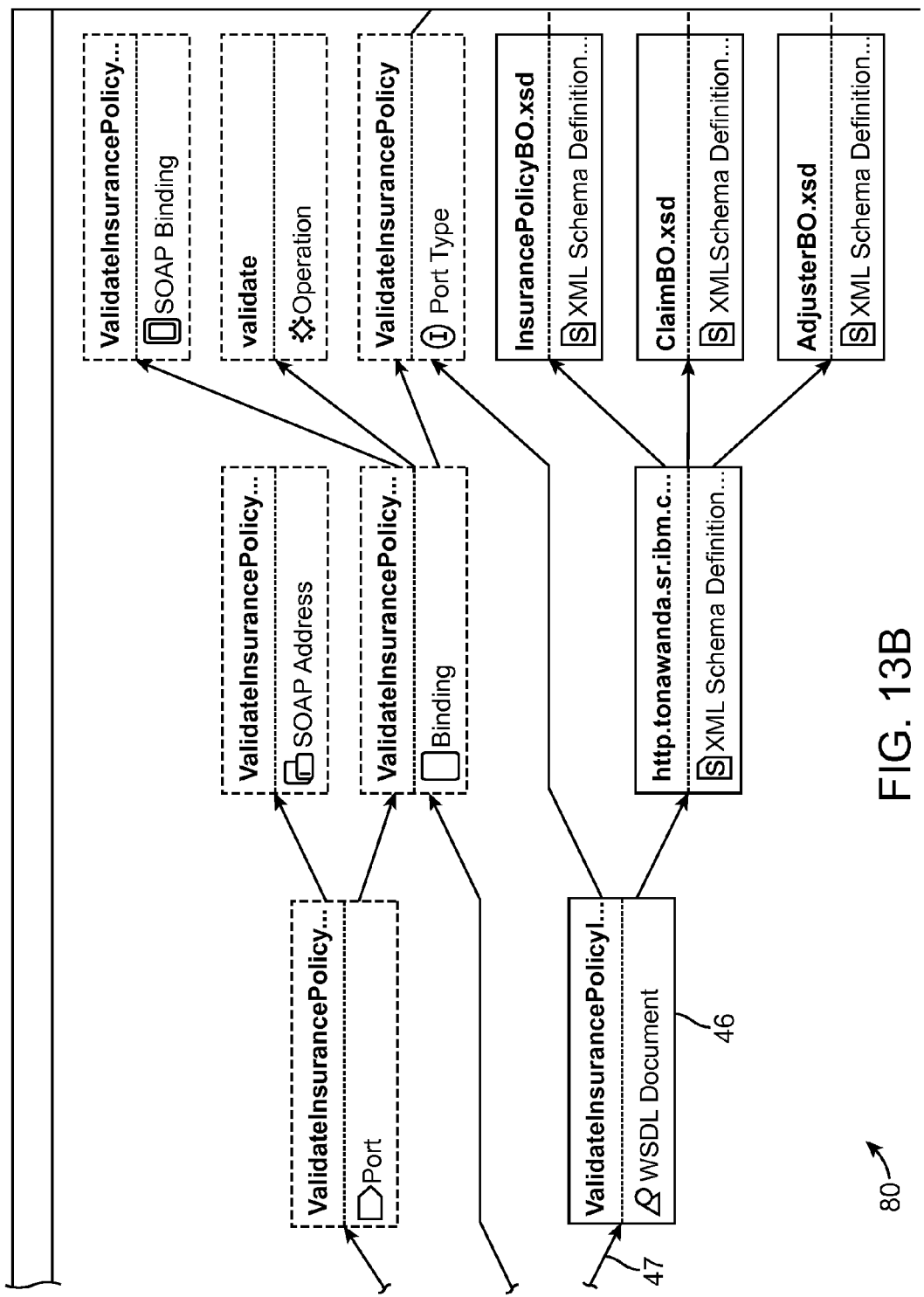

As shown by example in FIGS. 13A-B, a graph 80 of connected objects is presented in a hierarchical manner, starting at an origin, or root object 31, with objects 46 shown as geometrical shapes, connected by lines/edges 47 which represent relationships between any two objects. The direction of the lines can indicate the direction of the relationship. In the graph 80, objects on the left of the edge 47 has a dependency on the objects on the right side of the edge 47. If, for example, the item of type "XML Schema Definition" with name starting "http:tonawanda.sr.ibm.c" is removed, the three WSDL documents to its left would be affected. These WSDL documents have an inbound relationship to the XML schema definition document (i.e., the three WSDL documents all depend on the XML schema definition document to be present). The same XML schema definition document has outbound relationships to three more XML schema definition objects in the graph 80.

The types of relationships that are traversed as part of impact analysis, and whether the relationships are outbound from the object of interest (the origin or root) or inbound, and how many objects from the root the analysis occurs is based on user choice. An example of this selection is shown in an example view 82 in FIG. 14 as a selection 84. The impact analysis output results from view 82 are presented by example in FIGS. 15A-B as a table 85. The output results show which objects depend on which other objects, the relationships involved, and the direction of relationship ("depends on" vs. "depended on by").

Figure 16A:
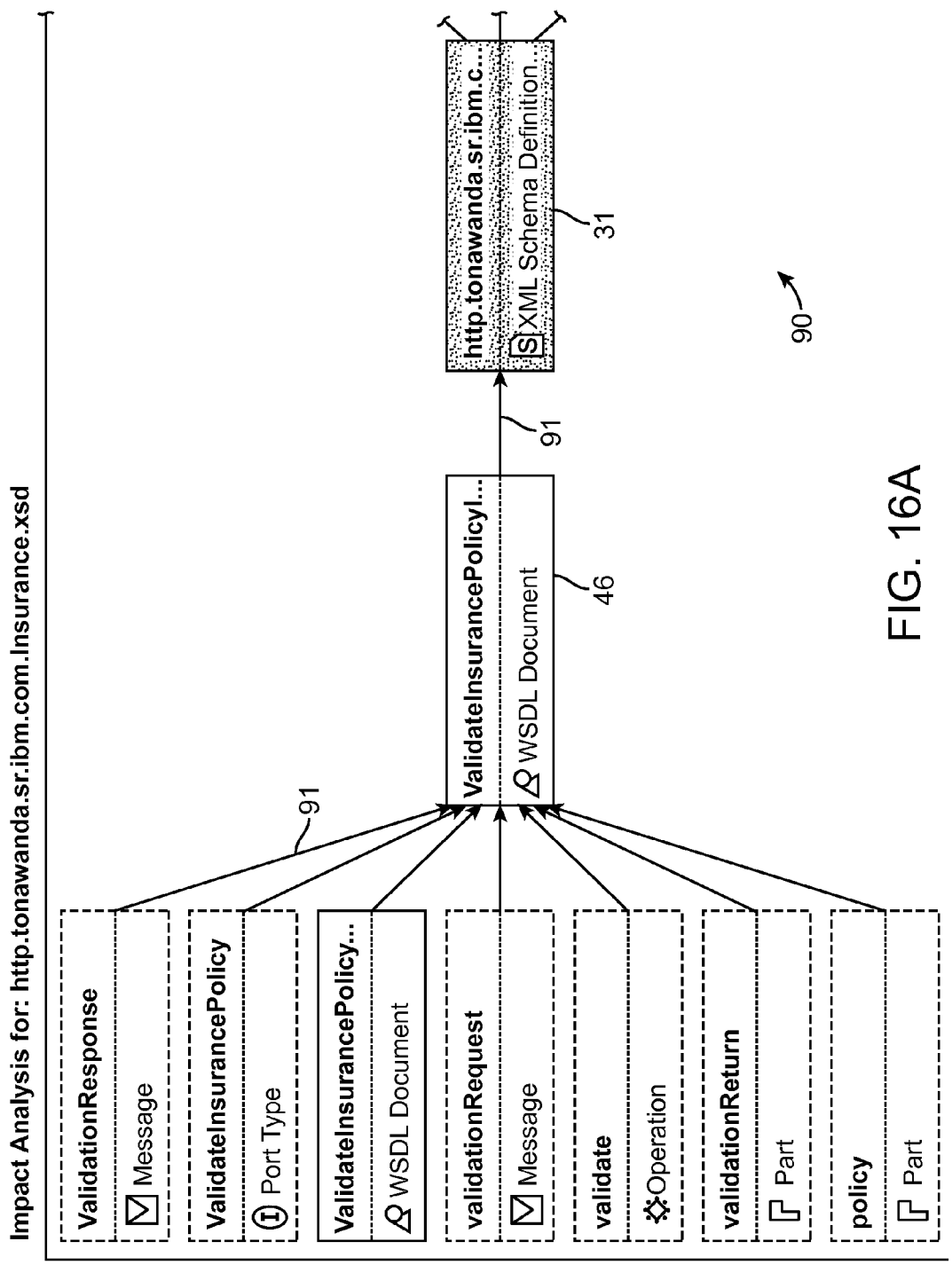
Figure 16B:
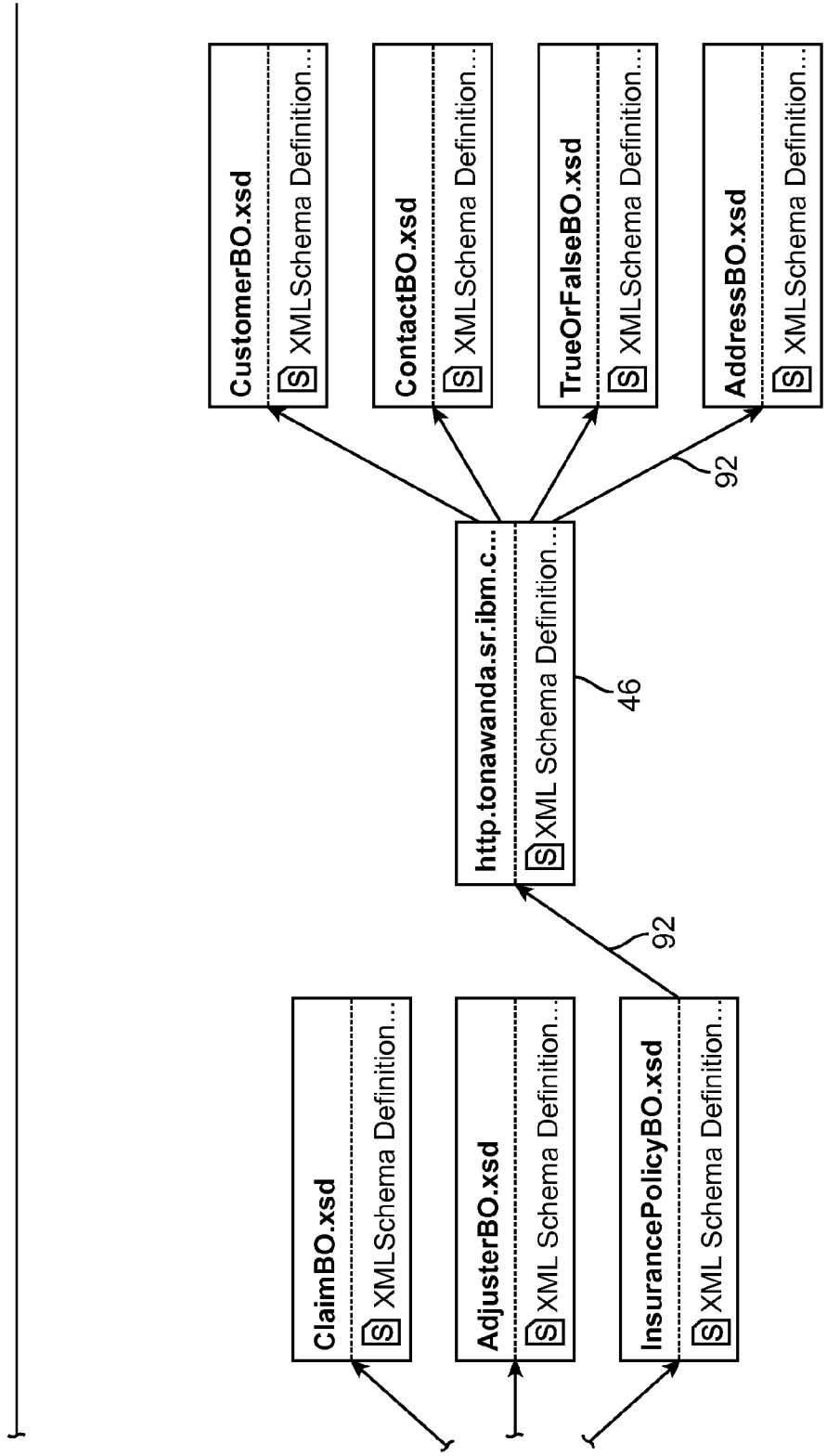

To obtain a better understanding of how changing one object could affect many others, according to an embodiment of the invention, the tabular impact analysis results are presented in a graphic view 90 shown in FIGS. 16A-B. The graph view 90 more clearly conveys the inter-relationships (i.e., "depends on" vs. "depended on by") in visual form.

Specifically, the relationships 47 (e.g., FIG. 13) are shown in the graph view 90 (FIG. 16) as inbound relationships 91 ("depends on") to the left, upstream, of the root object 31, and as outbound relationships 92 ("depended on by") to the right, downstream, of the root object 31. In the graph 90, the objects that are connected to the root object 31 by inbound relationships that are marked as "depends on" in the impact analysis result table 85 (FIG. 15), appear to the right, downstream, of the root object 31, and by outbound relationships that are connected to the root object 31 marked as "depended on by" (i.e., depend from) in the table 85 appear to the left, upstream, of the object 31. It can be quickly seen in the graph view 90 that changing the root object 31 will directly affect the "ValidateInsurancePolicyI WSDL Document" and all objects upstream of that document (on left side of root object 31 in the graph 90). The root object 31 is dependent on eight XML schema definition document objects (on right side of object 31 in the graph 90).

In FIGS. 16A-B, the objects upstream (to the left) of the root object 31 represent an upstream graph (or inbound sub-graph), and the objects downstream from (to the right of) the root object 31 represent a downstream graph (or outbound sub-graph), wherein the sub-graphs are merged into one dependency graph view 90 according to an embodiment of the invention. The upstream and downstream graphs from the root object are generated separately using a single common algorithm and then joined (merged) together at the root object to generate each side of the dependency graph view. This is described below in more detail.

Server Processing

When the server application 14 (FIG. 1) is requested to generate graph coordinates and other information for impact analysis results, the server application follows this process to discover and maintain relationships that will end up in a graph view:

Step 1: The server application 14 (FIG. 1) receives a request for impact analysis (inbound/outbound or both, depth, and which relationships to traverse).

Step 2: The server graph creation function 18 performs outbound and inbound impact analysis calls to the API of an impact analysis module 14A as required.

Step 3: Impact analysis API returns a collection of results for each mode (inbound and outbound). If both inbound and outbound modes are required, there are two sets of results. Each result item from impact analysis API contains source object, target object (reference name), name of relationship and properties of the source object, including name, namespace, version, object type (e.g., impact analysis table 85 in FIG. 15).

Step 4: Considering the outbound results first, the server graph creation function 18 converts each result item to a graph edge object, adding to a graph edge list, and a graph node. All objects and edges are given a unique ID.

Step 5: The server graph creation function 18 identifies the root node object for the outbound results graph.

Step 6: The server graph creation function 18 uses the list of edge objects for the outbound results to perform graph layout functions to generate an object graph. The object graphs have coordinates set on each graph object to minimize edge crossings and to be presentable in an aesthetically pleasing way. The graph is hierarchical with a root node and multiple levels of descendant nodes, in a tree fashion. This graph for outbound results is stored in memory.

Step 7: Considering the inbound results next, the server graph creation function 18 converts each result item to a graph edge object in the same way as for outbound results (step 4). The same object ID generation process used for the outbound results is used for creating the edge and node objects for the inbound graph results. This ensures every node and edge object in the final, combined graph of objects has a unique identifier.

Step 8: The root node object for the inbound results graph is identified.

Step 9: The list of edge objects for the inbound results is given to the graph layout algorithm, which generates an object graph, with coordinates set on each graph object to minimize edge crossings and to be presentable in an aesthetically pleasing way. It will resemble a tree graph with a root node and objects connected to it arranged in one or more levels of nodes. Relationships will point towards the root rather than away, as they are inbound.

At this point there are two object graphs that contain nodes and edges arranged by the graph layout function, both with a node that represents the same, original root object. If presented in a left to right orientation, the outbound results graph start with the root object and connections representing relationships would be drawn to the right, connecting to objects in the graph. This is the preferred behavior. However, if the inbound results graph is drawn, it would also have its root object to the left of all the objects that connect to it, and that is not a preferred behavior. The preferable outcome is to have the objects and relationships from the inbound results drawn first (on the left), connecting to a root object. Then, the outbound results can be drawn from the root node as before. To achieve this, all the edges in the inbound results graph must be reversed in direction, and all the object coordinates assigned by the graph layout algorithm need to be reflected around the axis of orientation. This process is performed by the server graph creation function 18, as described below:

Step 10: All of the edges in the inbound object graph are reversed. Specifically, for each edge, the source and target nodes are switched. Target objects in the edge map become source objects.

Step 11: The coordinates of node objects of the inbound object graph are reflected across the axis of orientation. As such, for left to right orientation, x-coordinates are negated. For top to bottom orientation, y-coordinates are negated. Thus, objects that would have been drawn to the right of the root node would now appear to the left of the root node, making left to right interpretation of the graph possible.

Step 12: The inbound and object graphs are merged, with the common node being the root node. This is performed by identifying the root objects in each graph and choosing one which will replace the other such that there is one root for the combined graph. The ID of the root object being discarded is replaced throughout its original graph by the ID of the root object that will be the root object for both graphs. In one example, the root node ID of the outbound results graph is retained, and so any references to the root node ID for the inbound results graph is replaced by the ID of the root node in the outbound results graph.

Step 13: The two object graphs are then merged into one by combining the edge list, edge map, and node list. The end result is a directed graph with a central root node with connected trees either side of it showing inbound and outbound dependencies between objects.

Step 14: At this point there is a set of graph node objects and a set of graph edges. This collection of data is then given to the server graph processing function 19 to transform into a set of graph objects with coordinates such that the graph meets readability constraints, that is, the graph contents are arranged such that the connection crossings are minimized and connection lengths are reduced to reduce graph density and complexity. The graph data is serialized and returned to the client 11 as lightweight data via the communication link.

Client Processing

The client graph processing function 17 processes the object graph data, scaling the coordinates of objects to match the display area, and the client rendering function 16 renders shapes, icons to represent graph objects and adding text properties. Relationships between objects are drawn as connecting lines 91, 92 between the shapes 46, such as shown by example in FIG. 16.

The invention allows visualizing dependencies on an object. Upstream (inbound) and downstream (outbound) subgraphs from an object are considered separately and then joined together at the original object, using a single common algorithm to generate each side of the dependency graph. Existing graph layout algorithms can be reused for impact analysis results. There is no need to utilize a specialized algorithm that can handle object graphs that include both inbound and outbound relationships. All processing is performed on the server module. The client module where the graph is rendered is unaffected since the coordinates are transformed as part of the merge of the two object graphs. Graphical view of impact analysis results makes it easier to analyze inter-relationships between connected objects. Objects that appear in both inbound and outbound results are differentiated in the graph and end up either side of the root object.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

Figure 17:
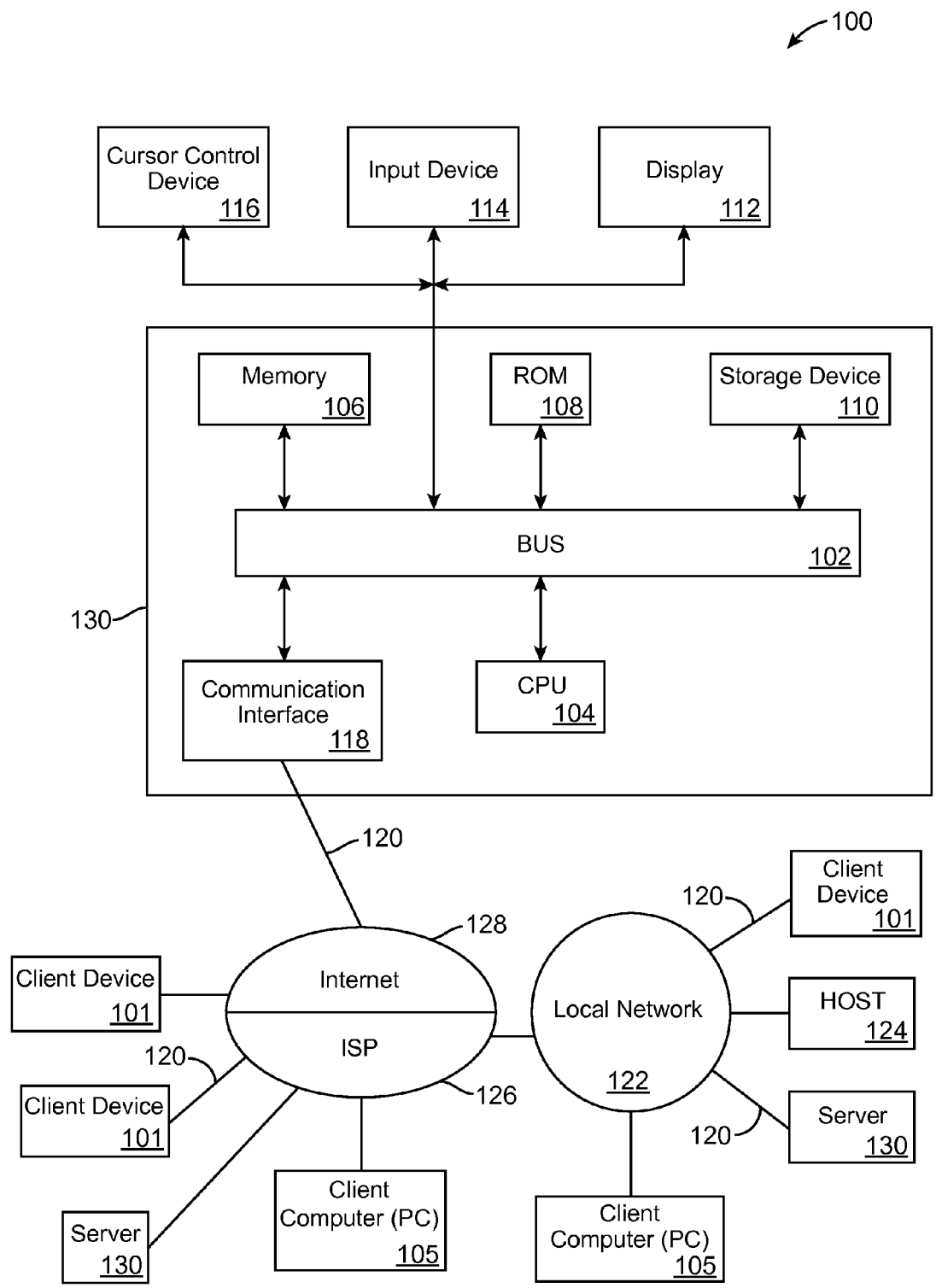
FIG. 17 shows a functional block diagram of an example computing environment implementing an embodiment of the invention.

FIG. 17 shows a block diagram of an example architecture of an embodiment of a system 100 configured to perform the processes described above, according to an embodiment of the invention. The system 100 includes one or more client devices 101 connected to one or more server computing systems 130. A server 130 includes a bus 102 or other communication mechanism for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for generating a graph view of multiply connected objects in a computing environment, comprising:
    a server employing a first hardware processor for generating graph data for a dependency graph view of bi-directional impact analysis results for multiply connected objects in a data source, wherein generating graph data further includes:
        generating graph data for an upstream graph representing multiply connected objects that depend on the selected object; and
        generating graph data for a downstream graph representing multiply connected objects that the selected object depends on; and
    the server employing the first hardware processor for transforming graph data objects into lightweight objects, and for transmitting the lightweight objects to a client; and
    the client employing a second hardware processor for rendering an interactive dynamic dependency graph view on a user interface based on the lightweight objects.

2. The method of claim 1, wherein generating graph data further includes:
    merging the upstream and the downstream graph data at the selected object to generate dependency graph data with the selected object as a shared root, to transmit to the client for rendering.

3. The method of claim 2 wherein:
    the impact analysis results include a first set of results representing upstream object dependency relationships, and a second set of results representing downstream object dependency relationships;
        generating hierarchical graph data for an upstream graph includes generating graph data for the upstream graph from the first set of results representing upstream object dependency relationships; and
        generating hierarchical graph data for a downstream graph includes generating graph data for the downstream graph from the second set of results representing downstream object dependency relationships.

4. The method of claim 3 wherein:
    the graph data for each graph includes identification of graph objects and object dependency information; and
    generating graph data for a dependency graph view further includes processing one of the downstream or upstream graph data such that the dependency relationships in the second set are reversed in direction into hierarchical graph data, and
    then merging the upstream and the downstream graph data at the selected object to generate dependency graph data with the selected object as a shared root, to transmit to the client.

5. The method of claim 4 wherein the dependency graph view includes visual elements connected by edges, such that the visual elements represent the objects and the edges represent dependency relationships between the objects.

6. The method of claim 1 wherein the computing environment comprises service registry computing environment.

7. The method of claim 6 wherein the client comprises a web browser on a thin client computing module, the server comprises a server application on a server computing module, wherein the thin client computing module and the server computing module may be connected via a communication link.

8. A computer program product for generating a graph view of multiply connected objects in a computing environment, comprising a non-transitory computer usable medium including a computer readable program including program instructions, wherein the computer readable program when executed on a computer system causes the computer system to:
    at a server, employing a first hardware processor for generating graph data for a dependency graph view of bi-directional impact analysis results for multiply connected objects in a data source, transforming graph data objects into lightweight object, and transmitting the lightweight objects to a client, wherein generating graph coordinate data further includes:
        generating graph data for an upstream graph representing multiply connected objects that depend on the selected object; and
        generating graph data for a downstream graph representing multiply connected objects that the selected object depends on; and
    at the client, employing a second hardware processor for rendering an interactive dynamic graph view on a user interface based on the lightweight objects.

9. The computer program product of claim 8 further including program instructions for generating graph data by:
merging the upstream and the downstream graph data at the selected object to generate dependency graph data with the selected object as a shared root, to transmit to the client for rendering.

10. The computer program product of claim 9 wherein:
the impact analysis results include a first set of results representing upstream object dependency relationships, and a second set of results representing downstream object dependency relationships;
the computer program product further includes instructions for generating graph data for the upstream graph from the first set of results representing upstream object dependency relationships; and
the computer program product further includes instructions for generating graph data for the downstream graph from the second set of results representing downstream object dependency relationships.

11. The computer program product of claim 10 wherein:
the graph data for each graph includes identification of graph objects and object dependency information; and
the computer program product further includes instructions for processing one of the downstream or upstream graph data such that the dependency relationships in the second set are reversed in direction into hierarchical graph data, and then merging the upstream and the downstream graph data at the selected object to generate dependency graph data with the selected object as a shared root, to transmit to the client.

12. The computer program product of claim 11 wherein the dependency graph view includes visual elements connected by edges, such that the visual elements represent the objects and the edges represent dependency relationships between the objects.

13. The computer program product of claim 8 wherein the computing environment comprises a service registry computing environment.

14. The computer program product of claim 13 wherein the client comprises a web browser on a thin client computing module, the server comprises a server application on a server computing module, wherein the client module and the server module may be connected via a communication link.

15. A system for generating a graph view on a user interface in a computing environment, comprising:
employing a first hardware processor with a server for generating graph data for a dependency graph view of bi-directional impact analysis results for multiply connected objects in a data source, transforming graph data objects into lightweight objects, and transmitting lightweight objects to a client, wherein generating graph data further includes:
generating graph data for an upstream graph representing multiply connected objects that depend on the selected object; and
generating graph data for a downstream graph representing multiply connected objects that the selected object depends on; and
a rendering function employing a second hardware processor at the client for rendering an interactive dynamic graph view of the multiply connected objects on a user interface, based on the lightweight objects.

16. The system of claim 15 wherein the server is further configured for generating graph data by:
merging the upstream and the downstream graph data at the selected object to generate dependency graph data with the selected object as a shared root, to transmit to the client for rendering.

17. The system of claim 16 wherein:
the impact analysis results include a first set of results representing upstream object dependency relationships, and a second set of results representing downstream object dependency relationships;
the server is further configured for generating graph data by:
generating graph data for the upstream graph from the first set of results representing upstream object dependency relationships; and
generating graph data for the downstream graph from the second set of results representing downstream object dependency relationships.

18. The system of claim 17 wherein:
the graph data for each graph includes identification of graph objects and object dependency information; and
the server is further configured for processing one of the downstream or upstream graph data such that the dependency relationships in the second set are reversed in direction into hierarchical graph data, and then merging the upstream and the downstream graph data at the selected object to generate dependency graph data with the selected object as a shared root.

19. The system of claim 18 wherein the dependency graph view includes visual elements connected by edges, such that the visual elements represent the objects and the edges represent dependency relationships between the objects.

20. The system of claim 15 wherein the computing environment comprises service registry computing environment, wherein the client comprises a web browser on a thin client computing module, the server comprises a server application on a server computing module, wherein the thin client computing module and the server computing module may be connected via a communication link.

* * * * *